(12) United States Patent
Peterson et al.

(10) Patent No.: US 12,475,015 B2
(45) Date of Patent: Nov. 18, 2025

(54) MANAGING RESOURCE CONSTRAINTS IN A CLOUD ENVIRONMENT

(71) Applicant: Oracle International Corporation, Redwood Shores, CA (US)

(72) Inventors: Eric Peterson, Seattle, WA (US); William Nickolas Moran, Austin, TX (US); Benjamin Todd Willey, Lexington, KY (US); Kenneth Richard Fox, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 81 days.

(21) Appl. No.: 18/647,893

(22) Filed: Apr. 26, 2024

(65) Prior Publication Data

US 2024/0364638 A1  Oct. 31, 2024

Related U.S. Application Data

(60) Provisional application No. 63/503,143, filed on May 18, 2023, provisional application No. 63/462,875, filed on Apr. 28, 2023.

(51) Int. Cl.
*G06F 11/32* (2006.01)
*G06F 11/20* (2006.01)
*G06F 11/30* (2006.01)

(52) U.S. Cl.
CPC ........ *G06F 11/327* (2013.01); *G06F 11/2028* (2013.01); *G06F 11/3055* (2013.01); *G06F 2201/81* (2013.01); *G06F 2201/815* (2013.01)

(58) Field of Classification Search
None
See application file for complete search history.

(56) References Cited

U.S. PATENT DOCUMENTS 9,092,502 B1  7/2015 Cannaliato et al.
9,306,814 B1  4/2016 Roth et al.
(Continued)

FOREIGN PATENT DOCUMENTS

EP  2893685 B1  7/2017
EP  3429156 A1  1/2019
(Continued)

OTHER PUBLICATIONS

Anonymous: "Oracle Cloud Infrastructure Documentation—Security Guide for Exadata Database Service on Cloud@Customer Systems", Apr. 1, 2023, XP093181902.
(Continued)

*Primary Examiner* — June Sison
(74) *Attorney, Agent, or Firm* — Invoke

(57) ABSTRACT

Techniques for managing resource constraints of a cloud environment are disclosed. A system receives a request to initiate a provisioning process for provisioning a first service in the cloud environment. The system determines a resource constraint associated with a resource that the first service utilizes. Based on the resource constraint, the system determines a set of candidate services that also utilize the resource as candidates for deprovisioning from the cloud environment. The system identifies respective service features of the set of candidate services and generates a ranking of the set of candidate services based on weighting metrics associated with the respective service features. Based on the ranking, the system selects a second service of the set of candidate services for deprovisioning from the cloud environment. The system deprovisions the second service to alleviate the resource constraint and then provisions the first service by executing the provisioning process.

20 Claims, 18 Drawing Sheets

(56) References Cited

U.S. PATENT DOCUMENTS

| | | | |
|---|---|---|---|
| 9,438,599 | B1 | 9/2016 | Yuhan et al. |
| 9,722,895 | B1 | 8/2017 | Sarukkai et al. |
| 10,878,483 | B1 | 12/2020 | Felbinger et al. |
| 11,720,536 | B1 * | 8/2023 | Kisser et al. |
| 2002/0198973 | A1 | 12/2002 | Besaw |
| 2013/0054426 | A1 | 2/2013 | Rowland et al. |
| 2013/0297711 | A1 | 11/2013 | Nhu |
| 2013/0304925 | A1 | 11/2013 | Ferris et al. |
| 2014/0280595 | A1 | 9/2014 | Mani et al. |
| 2015/0363852 | A1 | 12/2015 | Vautour |
| 2016/0043909 | A1 | 2/2016 | Pogrebinsky et al. |
| 2016/0277411 | A1 | 9/2016 | Dani et al. |
| 2017/0230229 | A1 | 8/2017 | Sasturkar et al. |
| 2018/0052861 | A1 | 2/2018 | Seetharaman et al. |
| 2018/0219784 | A1 | 8/2018 | Jiang et al. |
| 2019/0087835 | A1 | 3/2019 | Schwed et al. |
| 2019/0156000 | A1 | 5/2019 | Hoffmann et al. |
| 2019/0166007 | A1 | 5/2019 | Sundaram et al. |
| 2020/0014659 | A1 | 1/2020 | Chasman et al. |
| 2020/0112497 | A1 | 4/2020 | Yenumulapalli et al. |
| 2020/0117757 | A1 | 4/2020 | Yanamandra et al. |
| 2020/0358756 | A1 | 11/2020 | Rose et al. |
| 2021/0216190 | A1 | 7/2021 | Vakil et al. |
| 2021/0224122 | A1 * | 7/2021 | Glass ............... G06F 9/3836 |
| 2021/0234864 | A1 | 7/2021 | Dube et al. |
| 2021/0279109 | A1 | 9/2021 | Ji et al. |
| 2021/0377272 | A1 | 12/2021 | Dasari et al. |
| 2021/0392142 | A1 | 12/2021 | Stephens et al. |
| 2022/0091947 | A1 | 3/2022 | Kothari et al. |
| 2022/0103618 | A1 | 3/2022 | Pinheiro et al. |
| 2022/0150124 | A1 | 5/2022 | Cooley et al. |
| 2022/0255902 | A1 | 8/2022 | Woodson |
| 2022/0294818 | A1 | 9/2022 | Parekh et al. |
| 2022/0335340 | A1 | 10/2022 | Moustafa et al. |
| 2022/0374271 | A1 | 11/2022 | Pogrebinsky et al. |
| 2022/0382598 | A1 * | 12/2022 | Szabó ............... G06F 9/5072 |
| 2023/0109926 | A1 | 4/2023 | Nair et al. |
| 2023/0316348 | A1 | 10/2023 | Dageville et al. |
| 2023/0342179 | A1 | 10/2023 | Suttle et al. |
| 2023/0362161 | A1 | 11/2023 | Spector et al. |
| 2023/0385286 | A1 | 11/2023 | Glickman et al. |
| 2024/0054063 | A1 | 2/2024 | Wichelman et al. |
| 2024/0095739 | A1 | 3/2024 | Adogla et al. |
| 2024/0320240 | A1 | 9/2024 | Podder |
| 2024/0362130 | A1 * | 10/2024 | Berg ............... H04L 47/803 |
| 2024/0362142 | A1 * | 10/2024 | Berg ............... H04L 41/22 |
| 2024/0364579 | A1 * | 10/2024 | Peterson ............ G06F 11/2028 |
| 2025/0126028 | A1 * | 4/2025 | Mohan ............... H04L 41/22 |
| 2025/0199866 | A1 * | 6/2025 | Rushton ............. G06F 9/5027 |

FOREIGN PATENT DOCUMENTS

| | | |
|---|---|---|
| EP | 3271857 B1 | 4/2020 |
| WO | 2014/039921 A1 | 3/2014 |
| WO | 2021/150306 A1 | 7/2021 |
| WO | 2021/150307 A1 | 7/2021 |
| WO | 2021/174104 A1 | 9/2021 |

OTHER PUBLICATIONS

Anonymous: "Oracle Cloud Infrastructure Documentation-Overview of IAM", Feb. 8, 2023, XP093184083.
Anonymous: "Oracle Cloud Infrastructure Documentation—Renaming a Cloud Account", May 14, 2021, XP093185071.
Anonymous: "Oracle Cloud Infrastructure Documentation—Site-to-Site VPN Overview", Feb. 8, 2023, XP093184733.
Anonymous: "Oracle Cloud Infrastructure Documentation—Billing and cost management overview", Dec. 20, 2022, XP093183514.
Anonymous: "Oracle Cloud Infrastructure Documentation—Cloud Guard concepts", Jan. 18, 2022, XP093183028.
Anonymous: "Oracle Cloud Infrastructure Documentation—Getting Started with Policies", Jan. 4, 2023, XP093184099.
Anonymous: "Oracle Cloud Infrastructure Documentation—Getting Summary Information on the Overview Page", Aug. 16, 2022, XP093183031.
Anonymous: "Oracle Cloud Infrastructure Documentation—Learn Best Practices for Set ting Up Your Tenancy", Feb. 8, 2023, XP093184095.
Anonymous: "Oracle Cloud Infrastructure Documentation—Managing Compartments", Feb. 8, 2023, XP093184098.
Anonymous: "Oracle Cloud Infrastructure Documentation—Monitoring Threats", Sep. 28, 2022, XP093183035.
Anonymous: "Oracle Cloud Infrastructure Documentation—Overview of the Console Dashboards Service", Mar. 14, 2023, XP093184740.
Anonymous: "Oracle Cloud Infrastructure Documentation—Prerequisites for Oracle Platform Services on Oracle Cloud Infrastructure", Mar. 23, 2023, XP093185058.
Anonymous: "Oracle Cloud Infrastructure Documentation—Welcome to Oracle Cloud Infrastructure", Mar. 23, 2023, XP093182493.
Anonymous: "Oracle Gen 2 Exadata Cloud@Customer Security Controls", Jan. 11, 2023, XP093181973,.
Anonymous: "Oracle Operator Access Control Configuration and Administration Guide", Nov. 18, 2022, XP093181896.
Anonymous: "Oracle Public Sector Licensing and Permitting", 2022, XP093184298.
Anonymous: "Oracle Sovereign Cloud", Feb. 15, 2023, XP093184649.
Apps2fusion: "Security Roles in Oracle Fusion Cloud SLA", Nov. 30, 2018, XP093184293.
Magouryrk Clay: "Announcing Oracle Alloy: The power of the cloud in your hands", Oct. 18, 2022, XP093183485.
Q. S. Singh and Y. Liu, "A cloud service architecture for analyzing big monitoring data," in Tsinghua Science and Technology, vol. 21, No. 1, pp. 55-70, Feb. 2016, doi: 10.1109/TST.2016.7399283 (Year: 2016).
"Create a Reseller and Reseller Administrator User", Retrieved from https://abiquo.atlassian.net/wiki/spaces/ABI54/pages/310740667/Create+a+Reseller+and+Reseller+Administrator+User, May 3, 2022, pp. 1-5.
"General Variables for All Requests", Jun. 28, 2023, pp. 6.
"Overview of Access Approval", Retrieved from https://cloud.google.com/assured-workloads/access-approval/docs/overview, Jun. 6, 2024, pp. 5.
"Periodic 802.1X reauthentication", Retrieved from https://techhub.hpe.com/eginfolib/networking/docs/switches/5130ei/5200-3946_security_cg/content/485048074.htm, Retrieved from Oct. 25, 2023, p. 1.
"Policy Syntax", Jan. 4, 2023, pp. 7.
"Reinstate admin privileges for a customer's Azure CSP subscriptions", Retrieved from https://learn.microsoft.com/en-us/partner-center/reinstate-csp, Aug. 1, 2023, pp. 7.
"Tenant administrator settings", Retrieved from https://backstage.forgerock.com/docs/idcloud/latest/tenants/tenant-administrator-settings.html, Jun. 7, 2023, pp. 12.
"Verbs", Jun. 5, 2023, pp. 2.
Anonymbus: "Tokenization—(data security)", Wikipedia, Feb. 12, 2023, pp. 1-12.
Bhat S., "Admin access management in Azure Cloud Solution Provider (CSP) subscriptions", Retrieved from https://techcommunity.microsoft.com/t5/security-compliance-and-identity/admin-access-management-in-azure-cloud-solution-provider-csp/ba-p/3947126, Nov. 21, 2023, pp. 8.
Ducharme et al., "Seamlessly Protect Your IBM Cloud Application Infrastructure with Privileged Access Gateway", Oct. 3, 2022, pp. 13.
George et al., "Data anonymization and integrity checking in cloud computing", 2013 Fourth International Conference on Computing, Communications and Networking Technologies (ICCCNT), Jul. 2013, pp. 5.
Ma et al., "ServiceRank: Root Cause Identification of Anomaly in Large-Scale Microservice Architectures", : IEEE Transactions on Dependable and Secure Computing, vol. 19, No. 5, Sep.-Oct. 2022, pp. 3087-3100.

(56) References Cited

OTHER PUBLICATIONS

Soldani et al., "Anomaly Detection and Failure Root Cause Analysis in (Micro) Service-Based Cloud Applications: A Survey", ACM Computing Surveys, vol. 55, No. 3, Article 59, Feb. 2022, pp. 1-39.

* cited by examiner

MANAGING RESOURCE CONSTRAINTS IN A CLOUD ENVIRONMENT

BENEFIT CLAIMS; RELATED APPLICATIONS; INCORPORATION BY REFERENCE

This application claims the benefit of the following U.S. Provisional Patent Applications, which are hereby incorporated by reference: U.S. Provisional Patent Application Ser. No. 63/462,875, titled "SYSTEM AND METHOD FOR PROVIDING DEDICATED CLOUD ENVIRONMENTS FOR USE WITH A CLOUD COMPUTING INFRASTRUCTURE," filed Apr. 28, 2023; and U.S. Provisional Patent Application No. 63/503,143, titled "TECHNIQUES FOR VALIDATING AND TRACKING REGION BUILD SKILLS," filed May 18, 2023.

The following U.S. patent applications are hereby incorporated by reference: U.S. patent application Ser. No. 18/647,735, titled "HEALTH METRICS ASSOCIATED WITH CLOUD SERVICES," filed Apr. 26, 2024; U.S. patent application Ser. No. 18/647,971, titled "RESPONDING TO TRIGGER EVENTS THAT THREATEN AN OPERABILITY OF A CLOUD INFRASTRUCTURE," filed Apr. 26, 2024; U.S. patent application Ser. No. 18/498,964, titled "SKILLS SERVICE CONFIGURED TO MANAGE ASPECTS OF A BUILDING A DATA CENTER," filed Oct. 31, 2023; U.S. patent application Ser. No. 18/520,103, titled "TRACKING DATA CENTER BUILD DEPENDENCIES WITH CAPABILITIES AND SKILLS," filed Nov. 27, 2023; and U.S. patent application Ser. No. 18/537,902, titled "TRACKING DATA CENTER BUILD HEALTH," filed Dec. 13, 2023.

The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to cloud environments. More particularly, the present disclosure relates to managing resource constraints in a cloud environment.

BACKGROUND

A cloud computing environment can be used to provide access to a range of complementary cloud-based components, such as software applications or services, that enable organizations or enterprise customers to operate their applications and services in a highly available hosted environment. The benefits to an organization in moving their application and service needs to a cloud environment include a reduction in the cost and complexity of designing, building, operating, and maintaining their own on-premise data center, software application framework, or other information technology infrastructure.

Organizations that utilize a cloud environment may utilize various techniques to monitor the operations and performance of the cloud environment. Cloud operators may monitor the operations and performance of the cloud environment to gain insights into system health, detect operational issues, optimize resource allocation or utilization, and respond to issues that may arise.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
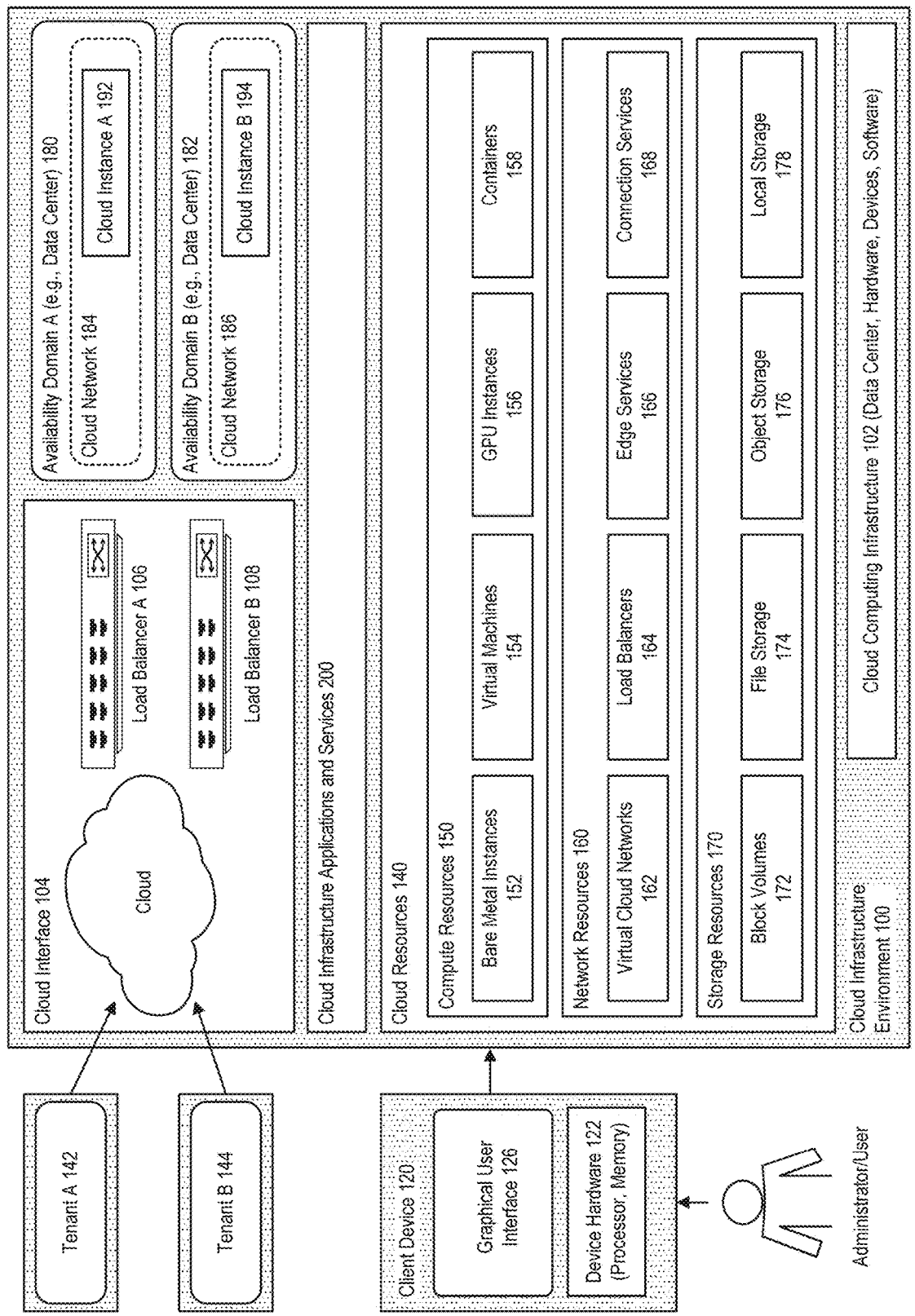
FIG. 1 illustrates a system for providing a cloud infrastructure environment in accordance with an embodiment.

In the following description, for the purposes of explanation, numerous specific details are set forth to provide a thorough understanding. One or more embodiments may be practiced without these specific details. Features described in one embodiment may be combined with features described in a different embodiment. In some examples, well-known structures and devices are described with reference to a block diagram form to avoid unnecessarily obscuring the present disclosure.

1. GENERAL OVERVIEW
2. EXAMPLE CLOUD ENVIRONMENTS
3. SYSTEM ARCHITECTURE FOR MANAGING RESOURCE CONSTRAINTS
4. EXAMPLE WEIGHTING METRICS
5. EXAMPLE OPERATIONS FOR MANAGING RESOURCE CONSTRAINTS
6. EXAMPLE CONSTRAINT MANAGEMENT INTERFACE
7. MISCELLANEOUS; EXTENSIONS

1. General Overview

One or more embodiments alleviate a resource constraint during a provisioning process for provisioning a first service in a cloud environment by selecting a second service for deprovisioning from the cloud environment. The second service is selected from a set of candidate services based on a weighting metric associated with respective service features of the candidate services. The set of candidate services include services that are executing during the provisioning process and that contribute to the resource constraint. The set of candidate services are ranked according to the weighting metric, and the second service is selected for deprovisioning based on the ranking.

In one example, a system determines, when installing a service in a partition of a cloud environment, that the partition has insufficient resources to complete the installation. The system determines that completing the installation requires deprovisioning one or more other services from the partition. The system determines what kind of resource has a resource constraint and a set of services as candidates for deprovisioning to alleviate the resource constraint. To select a service for deprovisioning, the set of candidate services are ranked according to a weighting metric, and one or more services are selected from the set of candidate services based on the ranking.

In one example, the system determines the weighting metric for the candidate services based on weights assigned to respective service features of the candidate services. The weight assigned to a service feature may represent a value of the service feature within a given context. Thus, the weighting metric for a particular service represents a combination of the values of the respective service features of the particular service. Additionally, or alternatively, the system may determine a weight for a particular service feature based on an impact that the particular service feature has on one or more downstream service features. A service feature may have a relatively higher weight when the service feature impacts a larger number of downstream service features and/or when the service feature impacts a downstream service feature that itself has a relatively higher weight.

In one example, a user, such as a dedicated or private label cloud (PLC) operator or customer, assigns weights to the service features of respective services deployed in a partition of the cloud environment allocated to an entity that is represented by the user. The weights assigned by the user may represent a relative value of the service features to the entity, for example, in the context of operational aspects performed in the partition of the cloud environment and/or in the context of business activities that depend on operations performed in the partition of the cloud environment. As between different partitions of the cloud environment, different instances of a particular service deployed in the respectively different partitions may have different values. Thus, the system may determine what services to deprovision for a particular partition based at least in part on the value of the services with respect to the particular partition. In one example, the system alleviates the resource constraint by deprovisioning one or more services that have a relatively lower value as indicated by the weighting metrics for the respective services.

In one example, the weighting metric for a service may represent the health of the service. The system may determine the health of the service based on a mapping between the service and a set of one or more service features of the service that are associated with a detected alarm. Additionally, or alternatively, the system may determine the health of a service based on an impact that service features of the service have on downstream service features. Thus, the system may determine what services to deprovision for a particular partition based at least in part on the health of the services with respect to the particular partition. In one example, the system alleviates the resource constraint by deprovisioning one or more services that have a relatively lower health as indicated by the weighting metrics for the respective services.

In one example, the weighting metric for a service may represent a combination of a relative value of the service and a health of the service. The system may determine a relative value of the respective service features of the service and a health metric for the respective service features of the service. In one example, the system alleviates the resource constraint by deprovisioning one or more services based on a combination of the value and the health of the service as indicated by the weighting metrics for the respective services. In one example, the system may deprovision a service based on a ranking that reflects one or more of the following: a relatively lower value and a relatively lower health, a relatively lower health and a relatively higher value, or a relatively lower value and a relatively higher health. Additionally, or alternatively, the system may avoid deprovisioning services that are healthy and have a relatively higher value.

One or more embodiments include a resource constraint management utility that collects, processes, and analyzes data generated by various components in a cloud environment. The resource constraint management utility generates weighting metrics and other information pertaining to the value, health, performance, or behavior services in the cloud environment. The resource constraint management utility provides insights into the operational status of the cloud environment, enabling cloud operators to monitor, troubleshoot, optimize, and secure the cloud infrastructure more effectively. The resource constraint management utility allows cloud operators to identify trends, detect anomalies, predict potential issues, and make informed decisions to improve the performance, reliability, and scalability of the cloud environment.

One or more embodiments determine the health of a service based on a mapping between the service and a set of one or more service features of the service that are associated with a detected alarm. In one example, a resource constraint management utility determines that a detected alarm is associated with a service feature, and that the service feature is associated with a service of a cloud environment. The resource constraint management utility computes a health metric for the service based at least on the detected alarm that is associated with the service feature. Additionally, the resource constraint management utility generates a visual representation that includes the health metric for display on a constraint management interface associated with the resource constraint management utility.

Additionally, alternatively, one or more embodiments determine the health of a service based on an impact that service features of the service have on downstream service features. In one example, a resource constraint management utility determines an impact weight for a first service feature of a service based on a set of downstream service features that depend on the first service feature. The resource constraint management utility then computes a weighting metric for the service by applying the impact weight to a health metric for the service. The resource constraint management utility generates a visual representation that includes the weighting metric, and the visual representation is displayed on a constraint management interface. Additionally, or alternatively, the resource constraint management utility may determine the health of a service based on an impact that upstream service features have on a service feature of the service.

The health metrics may be based on effects of detected alarms on service features, services, and/or the cloud environment. Additionally, or alternatively, the health metrics may be based on user-defined valuations for respective service features and/or services. In one example, the resource constraint management utility may determine a health metric for a particular service that represents a health state of the particular service based on the status of one or more service features of the particular service. Additionally, or alternatively, the resource constraint management utility may determine a health metric for a particular service that represents an impact of upstream services and/or service features that are depended upon by the particular service. Additionally, or alternatively, the resource constraint management utility may determine a health metric for a particular service that represents an impact of the particular service on one or more downstream services features and/or services that depend upon the particular service. In one example, health metrics may be determined for a plurality of services, and the plurality of services may be ranked and displayed according to rank. The ranking may be based on the effects of detected alarms and/or user-defined valuations. Cloud operators may utilize the rankings to identify particular services for focusing operational activities, such as troubleshooting of alarms or performing system maintenance.

In one example, a cloud infrastructure provider deploys the resource constraint management utility and/or the constraint management interface to a partition, such as a tenancy, of a cloud environment. The partition may be a PLC tenancy provisioned for a PLC operator such as a customer that operates as reseller. The cloud infrastructure provider may transfer operation of the partition to the PLC operator or customer after deployment of the resource constraint management utility. One or more operators may access and utilize the resource constraint management utility to monitor the operations and performance of the cloud environment. The resource constraint management utility may provide insights into system health and/or identify operational issues. Additionally, or alternatively, operators may utilize the resource constraint management utility to optimize resource allocation or utilization and/or to promptly respond to issues that may arise.

One or more embodiments described in this Specification and/or recited in the claims may not be included in this General Overview section.

2. Example Cloud Environments

One or more embodiments provide features associated with cloud environments, including PLC environments. The cloud environments can be utilized, for example, by customers or tenants of a cloud infrastructure provider or reseller, in accessing software products, services, or other cloud offerings.

A cloud computing or cloud infrastructure environment can be used to provide access to a range of complementary cloud-based components, such as software applications or services, that enable organizations or enterprise customers to operate their applications and services in a highly available hosted environment. The benefits to an organization in moving their application and service needs to a cloud infrastructure environment include a reduction in the cost and complexity of designing, building, operating, and maintaining their own on-premise data center, software application framework, or other information technology infrastructure. Organizations that utilize a cloud environment may utilize various operational tools to monitor the operations and performance of the cloud environment.

Cloud Infrastructure Environments

Figure 2:
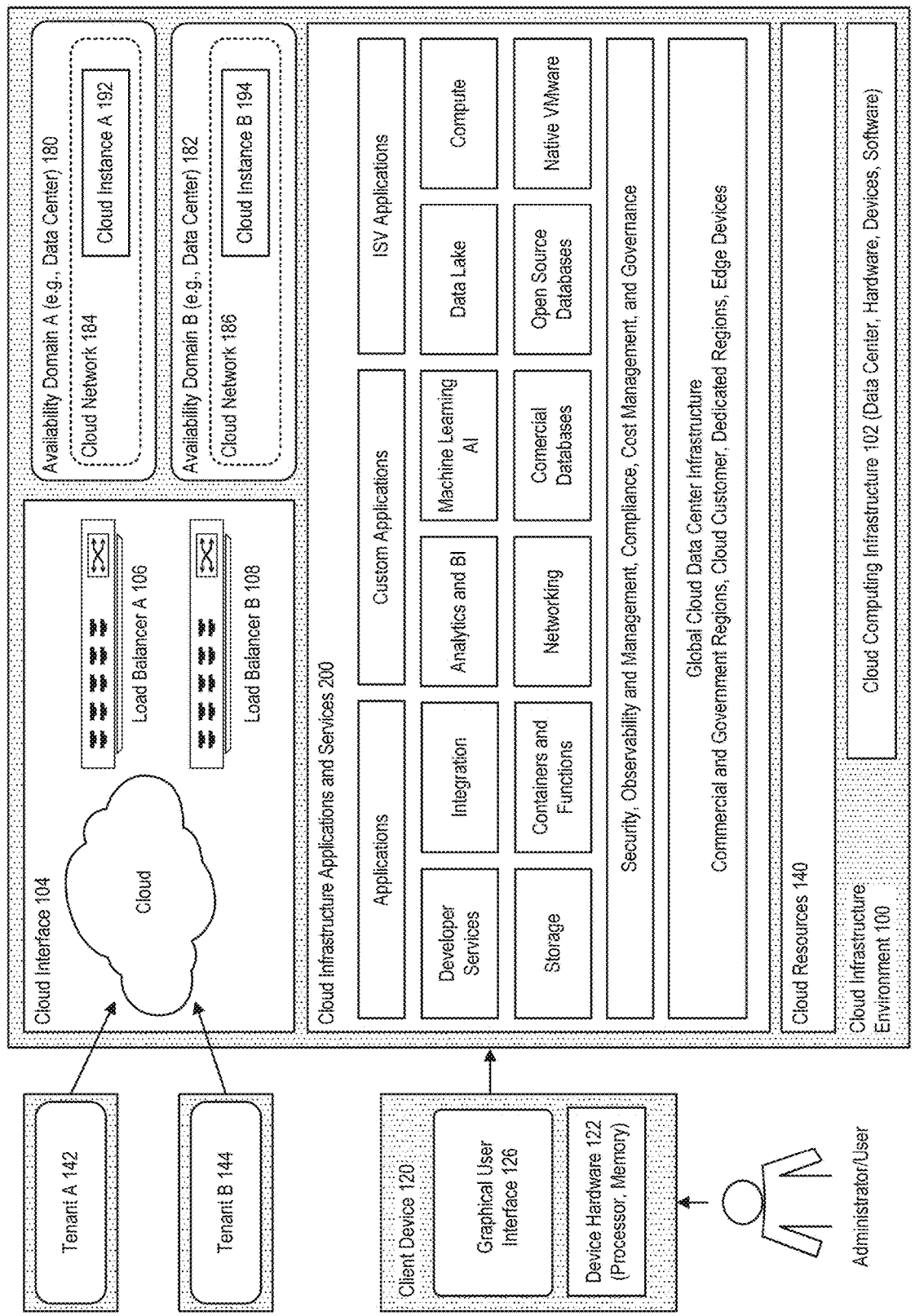
FIG. 2 further illustrates how a cloud infrastructure environment can be used to provide cloud-based applications or services or services in accordance with an embodiment.

FIGS. 1 and 2 illustrate a system for providing a cloud infrastructure environment in accordance with an embodiment.

In accordance with an embodiment, the components and processes illustrated in FIG. 1, and as further described herein regarding various embodiments, can be provided as software or program code executable by a computer system or other type of processing device, for example, a cloud computing system.

The illustrated example is provided for purposes of illustrating a computing environment that can be used to provide dedicated or private label cloud environments for use by tenants of a cloud infrastructure in accessing subscription-based software products, services, or other offerings associated with the cloud infrastructure environment. In accordance with other embodiments, the various components, processes, and features described herein can be used with other types of cloud computing environments.

As illustrated in FIG. 1, in accordance with an embodiment, a cloud infrastructure environment 100 can operate on a cloud computing infrastructure 102 comprising hardware (e.g., processor, memory), software resources, and one or more cloud interfaces 104 or other application program interfaces (API) that provide access to the shared cloud resources via one or more load balancers A 106, B 108. Cloud interface 102 includes user interfaces and APIs provided by a cloud services provider for interacting with its cloud services. This includes tools and platforms that allow users and administrators to manage, configure, and monitor cloud resources and services. Cloud interface 102 may include a console, such as a web-based user interface that provides a visual way to interact with and manage cloud resources. Through the console, users may, for example, create, configure, and monitor cloud services like compute instances, databases, storage, and networking components. Cloud interface 102 may also include a command line interface for users who prefer to work with the cloud infrastructure using command-line tools. The CLI allows for scripting and automation of cloud management tasks in an embodiment.

In accordance with an embodiment, load balancer A 106 and load balancer B 108 are services that distribute incoming network traffic across multiple servers, instances, or other resources to ensure that no single resource bears too much demand. By spreading the requests evenly across the resources, load balancers enhance the responsiveness and availability of resources such as applications, websites, or databases. Load balancer A 106 and load balancer B 108 may be either public load balancers that are accessible from the Internet and used for distributing external traffic, or private load balancers that are used within a virtual cloud network (VCN) and are not accessible from the public Internet (and are therefore ideal for internal traffic distribution). In an embodiment, load balancer A 106 and load balancer B 108 are designed for high availability and fault tolerance and are implemented in a redundant configuration across multiple availability domains or fault domains.

In accordance with an embodiment, the cloud infrastructure environment supports the use of availability domains, such as availability domain A 180 and availability domain B 182, that enable customers to create and access cloud networks 184, 186, and run cloud instances A 192, B 194. In an embodiment, availability A 180 and availability domain B 182 may represent a data center, or a set of data centers located within a region. These availability domains may be isolated from each other, meaning that they may not share the same physical infrastructure such as power or cooling systems. This design provides a high degree of failure independence and robustness. In an embodiment, a fault domain may provide additional protection and resiliency within a single availability domain by grouping hardware and infrastructure within an availability domain that is isolated from other fault domains. This isolation may be in terms of electricity, cooling, and other potential sources of failure.

In accordance with an embodiment, a tenancy (a container for resources used by a tenant) can be created for each cloud tenant/customer, for example, tenant A 142, B 144, that provides a secure and isolated partition within the cloud infrastructure environment where the customer can create, organize, and administer their cloud resources. A cloud tenant/customer can access an availability domain and a cloud network to access each of their cloud instances. A tenancy in is isolated from other tenancies, ensuring that each customer's data and resources are secure and inaccessible to others. Within a tenancy, customers can create, manage, and organize a wide range of cloud resources, including compute instances, storage volumes, and networks. In Identity and Access Management (IAM) service enables the management of users, groups, and policies within a tenancy. Through IAM, customers can control who has access to their resources and what actions they can perform. The tenancy is also the level where billing and subscription management are handled. Usage and costs associated with the resources within a tenancy are tracked and billed collectively under that tenancy. Each tenancy may be associated with specific service limits and quotas for various resources. These limits may be used to help manage capacity and facilitate resource distribution across each tenant.

In accordance with an embodiment, a computing device, such as a client device 120 having a device hardware 122 (e.g., processor, memory) and graphical user interface 126, can enable an administrator or other user to communicate with the cloud infrastructure environment via a network, such as a wide area network, a local area network, or the Internet, to create or update cloud services.

In accordance with an embodiment, the cloud infrastructure environment provides access to shared cloud resources 140 via, for example, a compute resources layer 150, a network resources layer 160, and/or a storage resources layer 170. Customers can launch cloud instances as needed to meet compute and application requirements. After a customer provisions and launches a cloud instance, the provisioned cloud instance can be accessed from a client device such as client device 120.

In accordance with an embodiment, compute resources 150 can comprise resources, such as bare metal cloud instances 152, virtual machines 154, graphical processing unit (GPU) compute cloud instances 156, and/or containers 158. A bare metal instance represents a physical server with dedicated hardware that is fully allocated to a single tenant. A bare metal instance provides direct access to the server's processor, memory, storage, and other hardware resources. A virtual machine (VM) is a software emulation of a physical computer that runs an operating system and applications like a physical computer. VMs allow multiple operating systems to run on a single physical machine or across multiple machines. A hypervisor layer resides between the hardware and the virtual machines, allocating physical resources (like CPU, memory, and storage) to each VM. In an embodiment, GPU compute cloud instances provide GPUs along with traditional CPU resources. These instances are designed for tasks that require significant parallel processing power, making them ideal for applications like machine learning, scientific computing, 3D rendering, and video processing. In an embodiment, Containers 158 use a method of virtualization that allows for the running of multiple isolated applications on a single control host, virtualizing the operating system. Each container shares the host system's kernel but runs in an isolated user space, making containers lightweight and efficient.

The components of the compute resources 150 can be used to provision and manage bare metal compute cloud instances or provision cloud instances as needed to deploy and run applications, as in an on-premises data center. For example, in accordance with an embodiment, the cloud infrastructure environment can provide control of physical host (bare metal) machines within the compute resources layer that run as compute cloud instances directly on bare metal servers without a hypervisor.

In accordance with an embodiment, the cloud infrastructure environment can also provide control of virtual machines within the compute resources layer that can be launched, for example, from an image, wherein the types and quantities of resources available to a virtual machine cloud instance can be determined, for example, based upon the image that the virtual machine was launched from.

In accordance with an embodiment, the network resources layer can comprise several network-related resources, such as virtual cloud networks (VCNs) 162, load balancers 164, edge services 166, and/or connection services 168. In an embodiment, a virtual cloud network (VCN) is a customizable and private network in a cloud environment. A VCN provides a virtual version of a traditional network, including subnets, route tables, and gateways. It allows users to set up their cloud-based network architecture according to their requirements. In an embodiment, edge services 166 include services and technologies designed to bring computation, data storage, and networking capabilities closer to the location where they are needed. Edge services 166 may be used to optimize traffic, reduce latency, or provide other advantages.

In accordance with an embodiment, the storage resources layer can comprise several resources, such as data/block volumes 172, file storage 174, object storage 176, and/or local storage 178. Data/block volumes 172 provide unformatted block-level storage that can be used to create file systems that host databases or for other purposes requiring unformatted storage. File storage 174 provides a file system in an embodiment and may offer shared file systems that multiple instances can access concurrently using standard file storage protocols. Object storage 176 manages data as objects within storage buckets. Objects have certain attributes that may include data, metadata, and a unique identifier. Local storage 178 refers to storage devices that are physically attached to the host computer.

As illustrated in FIG. 2, in accordance with an embodiment, the cloud infrastructure environment can include a range of complementary cloud-based components, such as cloud infrastructure applications and services 200, that enable organizations or enterprise customers to operate their applications and services in a highly available hosted environment.

In accordance with an embodiment, a self-contained cloud region can be provided as a complete, e.g., Oracle Cloud Infrastructure (OCI), dedicated region within an organization's data center that offers the data center operator the agility, scalability, and economics of an e.g., OCI public cloud, while retaining full control of their data and applications to meet security, regulatory, or data residency requirements.

For example, in accordance with an embodiment, such an environment can include racks physically and logically managed by a cloud infrastructure provider (e.g., Oracle), customer's racks, access for cloud operations personnel for setup and hardware support, customer's data center power and cooling, customer's floor space, an area for customer's data center personnel, and a physical access cage.

In accordance with an embodiment, a dedicated region offers to a tenant/customer the same set of infrastructure-as-a-service (IaaS), platform-as-a-service (PaaS), and software-as-a-service (SaaS) products or services available in the cloud infrastructure provider's (e.g., Oracle's) public cloud regions, for example, ERP, Financials, HCM, and SCM. A customer can seamlessly lift and shift legacy workloads using the cloud infrastructure provider's services (e.g., bare metal compute, VMs, and GPUs), database services (e.g., Oracle Autonomous Database), or container-based services (e.g., Oracle Container Engine for Kubernetes).

In accordance with an embodiment, a cloud infrastructure environment can operate according to an infrastructure-as-a-service (IaaS) model that enables the environment to provide virtualized computing resources over a public network (e.g., the Internet)

In an IaaS model, a cloud infrastructure provider can host the infrastructure components (e.g., servers, storage devices, network nodes (e.g., hardware), deployment software, platform virtualization (e.g., a hypervisor layer), or the like). In some cases, a cloud infrastructure provider may also supply a variety of services to accompany those infrastructure components; example services include billing software, monitoring software, logging software, load balancing software, or clustering software. Thus, as these services may be policy-driven, IaaS users may be able to implement policies to drive load balancing to maintain application availability and performance.

In accordance with an embodiment, IaaS customers may access resources and services through a wide area network (WAN), such as the Internet, and can use the cloud infrastructure provider's services to install the remaining elements of an application stack. For example, the user can log in to the IaaS platform to create virtual machines (VMs), install operating systems (OSs) on each VM, deploy middleware such as databases, create storage buckets for workloads and backups, and install enterprise software into that VM. Customers can then use the provider's services to perform various functions, including balancing network traffic, troubleshooting application issues, monitoring performance, or managing disaster recovery.

In accordance with an embodiment, a cloud infrastructure provider may, but need not, be a third-party service that specializes in providing (e.g., offering, renting, selling) IaaS. An entity might also opt to deploy a private cloud, becoming its own provider of infrastructure services.

In accordance with an embodiment, IaaS deployment is the process of putting a new application, or a new version of an application, onto a prepared application server or the like. It may also include the process of preparing the server (e.g., installing libraries or daemons). This is often managed by the cloud infrastructure provider below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like).

In accordance with an embodiment, IaaS provisioning may refer to acquiring computers or virtual hosts for use and installing needed libraries or services on them. In most cases, deployment does not include provisioning, and the provisioning may need to be performed first.

In accordance with an embodiment, challenges for IaaS provisioning include the initial challenge of provisioning the initial set of infrastructure before anything is running. Second, there is the challenge of evolving the existing infrastructure (e.g., adding new services, changing services, or removing services) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on others, and how they each work together) can be described declaratively. In some instances, once the topology is defined, a workflow can be generated that creates and/or manages the different components described in the configuration files.

In accordance with an embodiment, a cloud infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up for one or more virtual machines (VMs). Other infrastructure elements may also be provisioned, such as a load balancer, a database, or the like. As more infrastructure elements are desired and/or added, the infrastructure may incrementally evolve.

In accordance with an embodiment, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various geographic locations). However, in some examples, the infrastructure where the code will be deployed requires provisioning. In some instances, the provisioning can be done manually, a provisioning tool may be utilized to provision the resources, and/or deployment tools may be utilized to deploy the code once the infrastructure is provisioned.

Figure 3:
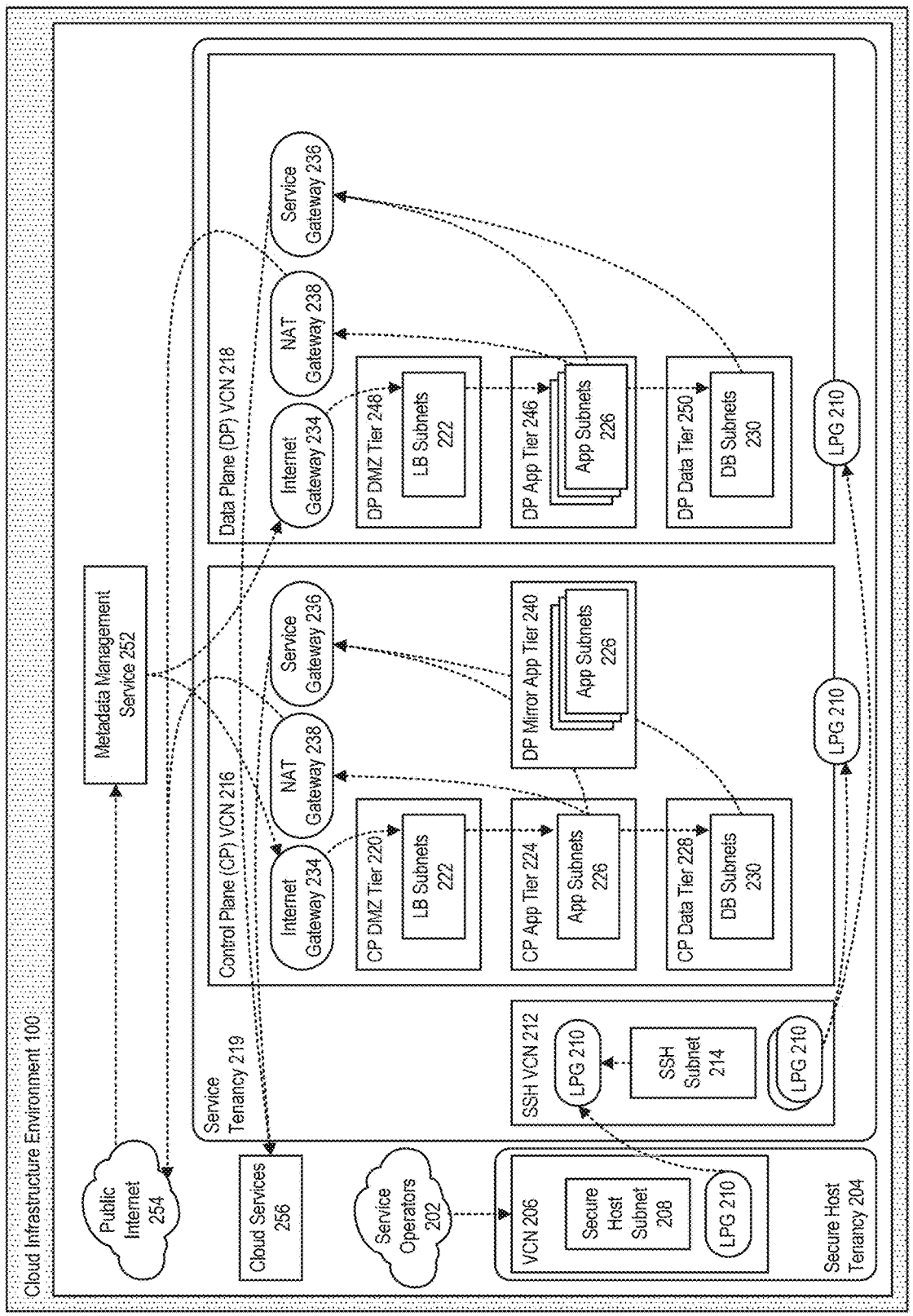
FIG. 3 illustrates an example cloud infrastructure architecture in accordance with an embodiment.

FIG. 3 illustrates an example cloud infrastructure architecture in accordance with an embodiment.

As illustrated in FIG. 3, in accordance with an embodiment, service operators 202 can be communicatively coupled to a secure host tenancy 204 that can include a virtual cloud network (VCN) 206 and a secure host subnet 208.

In some examples, the service operators may be using one or more client computing devices that may be portable handheld devices (e.g., a telephone, a computing tablet, a personal digital assistant (PDA)) or wearable devices (e.g., a head mounted display), running software such as Microsoft Windows, and/or a variety of mobile operating systems, such as iOS, Android, and the like, and being Internet, e-mail, short message service (SMS), or other communication protocol enabled. Alternatively, the client computing devices can be general purpose personal computers including, for example, personal computers and/or laptop computers running various versions of Microsoft Windows®, Apple Macintosh®, and/or Linux operating systems. The client computing devices can be workstation computers running any of a variety of commercially available UNIX® or UNIX-like operating systems, including without limitation the variety of GNU/Linux operating systems such as Chrome OS. Additionally, or alternatively, client computing devices may be any other electronic device, such as a thin-client computer, an Internet-enabled gaming system (e.g., a Microsoft Xbox gaming console), and/or a personal messaging device, capable of communicating over a network that can access the VCN and/or the Internet.

In accordance with an embodiment, a VCN can include a local peering gateway (LPG) 210 that can be communicatively coupled to a secure shell (SSH) VCN 212 via an LPG contained in the SSH VCN. The SSH VCN can include an SSH subnet 214, and the SSH VCN can be communicatively coupled to a control plane VCN 216 via the LPG contained in the control plane VCN. Also, the SSH VCN can be communicatively coupled to a data plane VCN 218 via an LPG. The control plane VCN and the data plane VCN can be contained in a service tenancy 219 that can be owned and/or operated by the cloud infrastructure provider.

In accordance with an embodiment, a control plane VCN can include a control plane demilitarized zone (DMZ) tier 220 that acts as a perimeter network (e.g., portions of a corporate network between the corporate intranet and external networks). The DMZ-based servers may have restricted responsibilities that help contain potential breaches. Additionally, the DMZ tier can include one or more load balancer (LB) subnets 222, a control plane app tier 224 that can include app subnets 226, and a control plane data tier 228 that can include database (DB) subnets 230 (e.g., frontend DB subnet(s) and/or backend DB subnet(s)). The LB subnet(s) contained in the control plane DMZ tier can be communicatively coupled to the app subnet(s) contained in the control plane app tier and to an Internet gateway 234 that can be contained in the control plane VCN. The app subnet(s) can be communicatively coupled to the DB subnet(s) contained in the control plane data tier, a service gateway 236, and a network address translation (NAT) gateway 238. The control plane VCN can include the service gateway and the NAT gateway.

In accordance with an embodiment, the control plane VCN can include a data plane mirror app tier 240 that can include app subnet(s). The app subnet(s) contained in the data plane mirror app tier can include a virtual network interface controller (VNIC) that can execute a compute instance. The compute instance can communicatively couple the app subnet(s) of the data plane mirror app tier to app subnet(s) that can be contained in a data plane app tier.

In accordance with an embodiment, the data plane VCN can include the data plane app tier, a data plane DMZ tier, and a data plane data tier. The data plane DMZ tier can include LB subnet(s) that can be communicatively coupled to the app subnet(s) of the data plane app tier and the Internet gateway of the data plane VCN. The app subnet(s) can be communicatively coupled to the service gateway of the data plane VCN and the NAT gateway of the data plane VCN. The data plane data tier can also include the DB subnet(s) that can be communicatively coupled to the app subnet(s) of the data plane app tier.

In accordance with an embodiment, the Internet gateway of the control plane VCN and of the data plane VCN can be communicatively coupled to a metadata management service 252 that can be communicatively coupled to the public Internet 254. The public Internet can be communicatively coupled to the NAT gateway of the control plane VCN and of the data plane VCN. The service gateway of the control plane VCN and of the data plane VCN can be communicatively coupled to cloud services 256.

In accordance with an embodiment, the service gateway of the control plane VCN, or of the data plane VCN, can make application programming interface (API) calls to cloud services without going through the public Internet. The API calls to cloud services from the service gateway can be one-way; the service gateway can make API calls to cloud services, and cloud services can send requested data to the service gateway. Generally, cloud services may not initiate API calls to the service gateway.

In accordance with an embodiment, the secure host tenancy can be directly connected to the service tenancy that may be otherwise isolated. The secure host subnet can communicate with the SSH subnet through an LPG that may enable two-way communication over an otherwise isolated system. Connecting the secure host subnet to the SSH subnet may give the secure host subnet access to other entities within the service tenancy.

In accordance with an embodiment, the control plane VCN may allow users of the service tenancy to set up or otherwise provision desired resources. Desired resources provisioned in the control plane VCN may be deployed or otherwise used in the data plane VCN. In some examples, the control plane VCN can be isolated from the data plane VCN, and the data plane mirror app tier of the control plane VCN can communicate with the data plane app tier of the data plane VCN via VNICs that can be contained in the data plane mirror app tier and the data plane app tier.

In accordance with an embodiment, users of the system, or customers, can make requests, for example, create, read, update, or delete (CRUD) operations through the public Internet that can communicate the requests to the metadata management service. The metadata management service can communicate the request to the control plane VCN through the Internet gateway. The request can be received by the LB subnet(s) contained in the control plane DMZ tier. The LB subnet(s) may determine that the request is valid, and in response to this determination, the LB subnet(s) can transmit the request to app subnet(s) contained in the control plane app tier. If the request is validated and requires a call to the public Internet, the call to the Internet may be transmitted to the NAT gateway that can make the call to the Internet. Metadata to be stored by the request can be stored in the DB subnet(s).

In accordance with an embodiment, the data plane mirror app tier can facilitate direct communication between the control plane VCN and the data plane VCN. For example, changes, updates, or other suitable modifications to configuration may be desired to be applied to the resources contained in the data plane VCN. By means of a VNIC, the control plane VCN can directly communicate with, and can thereby execute the changes, updates, or other suitable modifications to configuration to, resources contained in the data plane VCN.

In accordance with an embodiment, the control plane VCN and the data plane VCN can be contained in the service tenancy. In this case, the user, or the customer, of the system may not own or operate either the control plane VCN or the data plane VCN. Instead, the cloud infrastructure provider may own or operate the control plane VCN and the data plane VCN, both that may be contained in the service tenancy. This embodiment can enable isolation of networks that may prevent users or customers from interacting with the resources of other users or other customers. Also, this embodiment may allow users or customers of the system to store databases privately without needing to rely on the public Internet for storage that may not provide a desired level of threat prevention.

In accordance with an embodiment, the LB subnet(s) contained in the control plane VCN can be configured to receive a signal from the service gateway. In this embodiment, the control plane VCN and the data plane VCN may be configured to be called by a customer of the cloud infrastructure provider without calling the public Internet. Customers of the cloud infrastructure provider may desire this embodiment since the database(s) that the customers use may be controlled by the cloud infrastructure provider and may be stored on the service tenancy that may be isolated from the public Internet.

Figure 4:
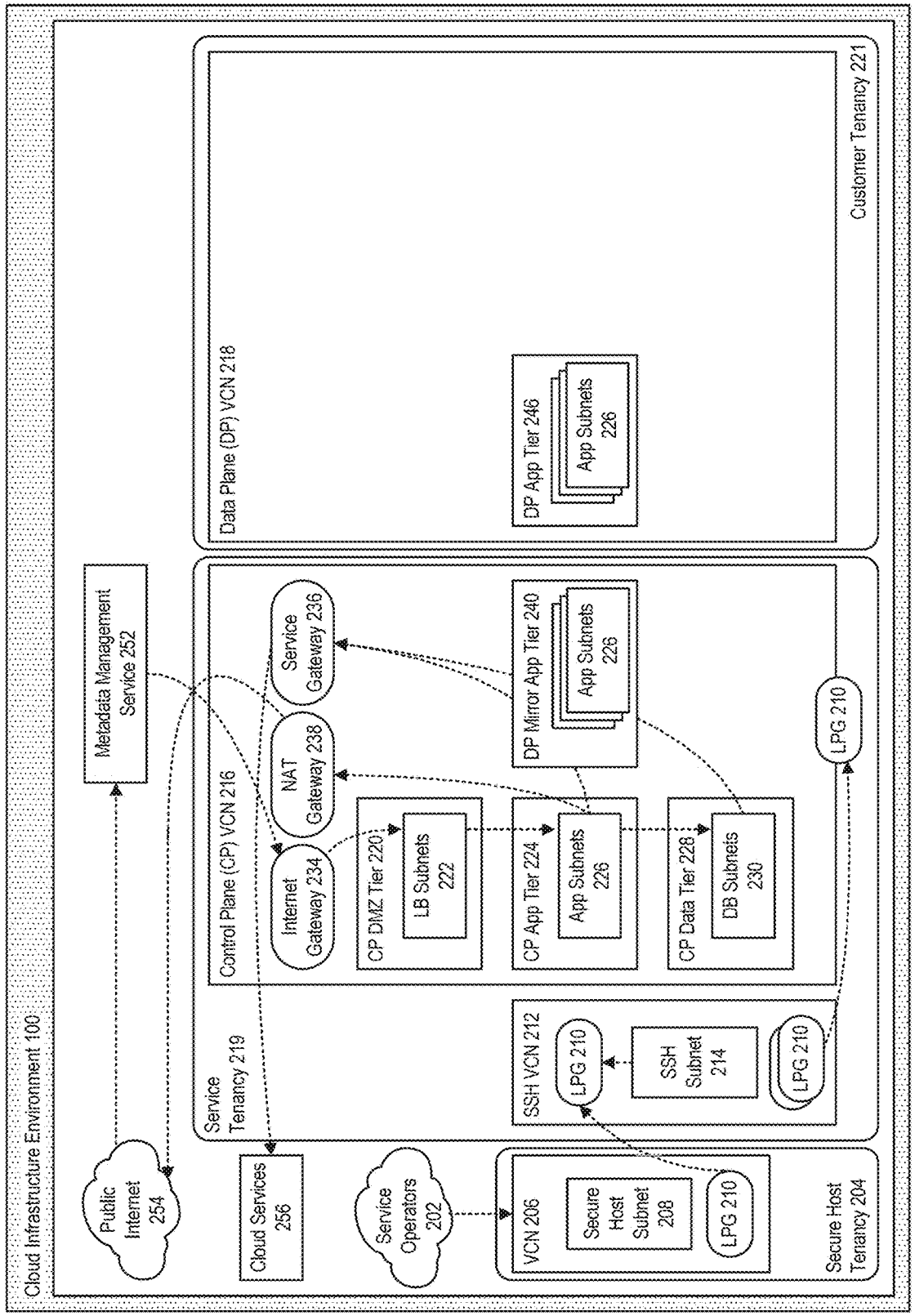
FIG. 4 illustrates another example of a cloud infrastructure architecture in accordance with an embodiment.

FIG. 4 illustrates another example of a cloud infrastructure architecture in accordance with an embodiment.

As illustrated in FIG. 4, in accordance with an embodiment, the data plane VCN can be contained in the customer tenancy 221. In this case, the cloud infrastructure provider may provide the control plane VCN for each customer, and the cloud infrastructure provider may, for each customer, set up a unique compute instance that is contained in the service tenancy. Each compute instance may allow communication between the control plane VCN, contained in the service tenancy, and the data plane VCN that is contained in the customer tenancy. The compute instance may allow resources provisioned in the control plane VCN contained in the service tenancy to be deployed or otherwise used in the data plane VCN contained in the customer tenancy.

In accordance with an embodiment, a customer of the cloud infrastructure provider may have databases that are managed and operated within the customer tenancy. In this example, the control plane VCN can include the data plane mirror app tier that can include app subnet(s). The data plane mirror app tier can reside in the data plane VCN, but the data plane mirror app tier may not be provided in the data plane VCN. That is, the data plane mirror app tier may have access to the customer tenancy, but the data plane mirror app tier may not exist in the data plane VCN or be owned or operated by the customer. The data plane mirror app tier may be configured to make calls to the data plane VCN, but the data plane mirror app tier may not be configured to make calls to any entity contained in the control plane VCN. The customer may desire to deploy or otherwise use resources in the data plane VCN that are provisioned in the control plane VCN, and the data plane mirror app tier can facilitate the desired deployment, or other usage of resources, by the customer.

In accordance with an embodiment, a customer of the cloud infrastructure provider can apply filters to the data plane VCN. In this embodiment, the customer can determine what the data plane VCN can access, and the customer may restrict access to the public Internet from the data plane VCN. The cloud infrastructure provider may not be able to apply filters or otherwise control access of the data plane VCN to any outside networks or databases. Applying filters and controls by the customer onto the data plane VCN, contained in the customer tenancy, can help isolate the data plane VCN from other customers and from the public Internet.

In accordance with an embodiment, cloud services can be called by the service gateway to access services that may not exist on the public Internet, on the control plane VCN, or on the data plane VCN. The connection between cloud services and the control plane VCN or the data plane VCN may not be continuous. Cloud services may exist on a different network owned or operated by the cloud infrastructure provider. Cloud services may be configured to receive calls from the service gateway and may be configured to not receive calls from the public Internet. Some cloud services may be isolated from other cloud services, and the control plane VCN may be isolated from cloud services that may not be in the same region as the control plane VCN.

For example, in accordance with an embodiment, the control plane VCN may be located in a "Region 1," and a cloud service "Deployment 1," may be located in Region 1 and in "Region 2." If a call to Deployment 1 is made by the service gateway contained in the control plane VCN located in Region 1, the call may be transmitted to Deployment 1 in Region 1. In this example, the control plane VCN, or Deployment 1 in Region 1, may not be communicatively coupled to, or otherwise in communication with, Deployment 1 in Region 2.

Figure 5:
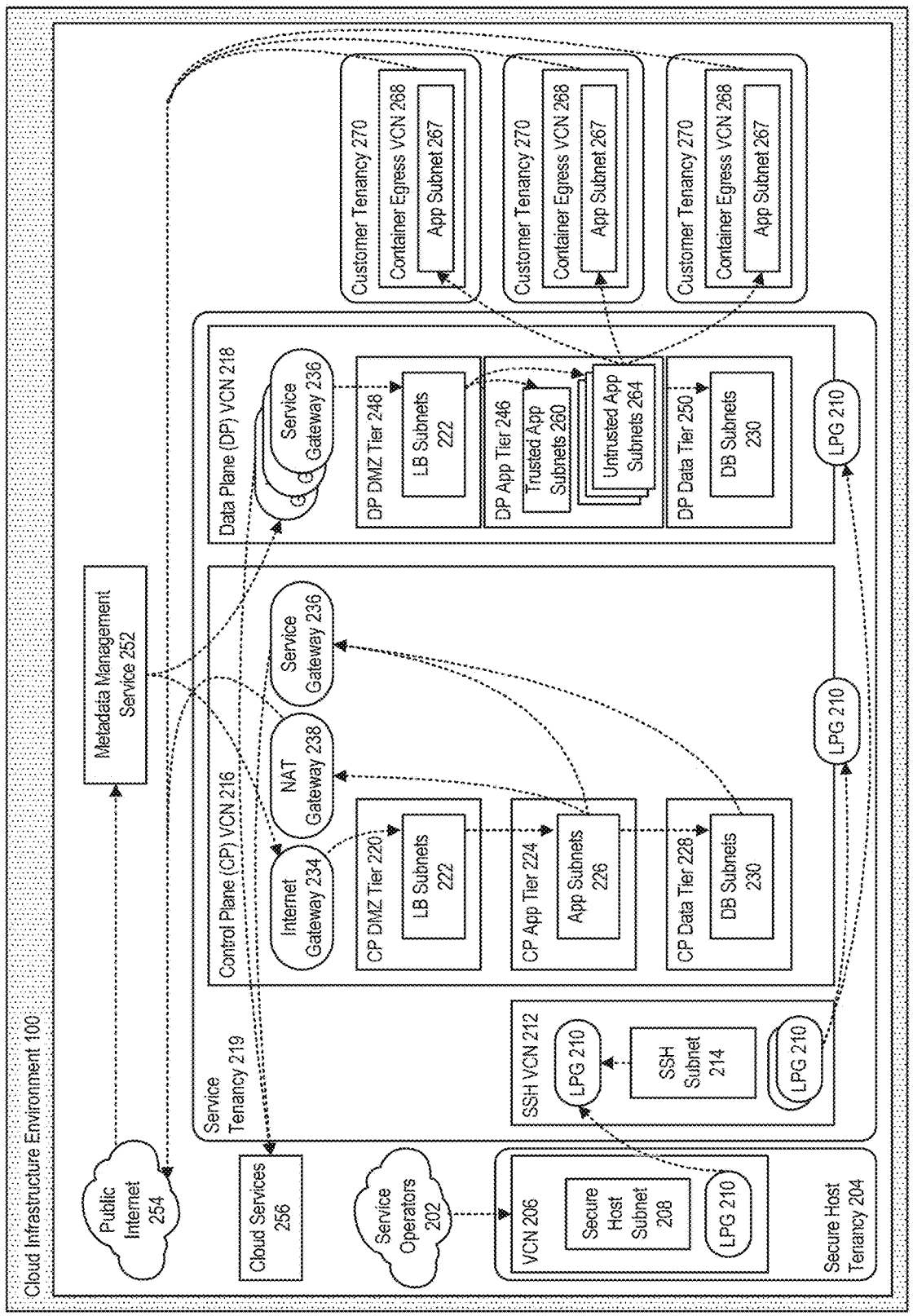
FIG. 5 illustrates another example of a cloud infrastructure architecture in accordance with an embodiment.

FIG. 5 illustrates another example of a cloud infrastructure architecture in accordance with an embodiment.

As illustrated in FIG. 5, in accordance with an embodiment, the trusted app subnets 260 can be communicatively coupled to the service gateway contained in the data plane VCN, the NAT gateway contained in the data plane VCN, and DB subnet(s) contained in the data plane data tier. The untrusted app subnets 264 can be communicatively coupled to the service gateway contained in the data plane VCN and DB subnet(s) contained in the data plane data tier. The data plane data tier can include DB subnet(s) that can be communicatively coupled to the service gateway contained in the data plane VCN.

In accordance with an embodiment, untrusted app subnet(s) can include one or more primary VNICs (1)-(N) that can be communicatively coupled to tenant virtual machines (VMs). Each tenant VM can be communicatively coupled to a respective app subnet 267 (1)-(N) that can be contained in respective container egress VCNs 268 (1)-(N) that can be contained in respective customer tenancies 270 (1)-(N). Respective secondary VNICs can facilitate communication between the untrusted app subnet(s) contained in the data plane VCN and the app subnet contained in the container egress VCN. Each container egress VCN can include a NAT gateway that can be communicatively coupled to the public Internet.

In accordance with an embodiment, the public Internet can be communicatively coupled to the NAT gateway contained in the control plane VCN and contained in the data plane VCN. The service gateway contained in the control plane VCN and contained in the data plane VCN can be communicatively coupled to cloud services.

In accordance with an embodiment, the data plane VCN can be integrated with customer tenancies. This integration can be useful or desirable for customers of the cloud infrastructure provider in cases that may require additional support when executing code. For example, the customer may provide code to run that may be potentially destructive, may communicate with other customer resources, or may otherwise cause undesirable effects.

In accordance with an embodiment, a customer of the cloud infrastructure provider may grant temporary network access to the cloud infrastructure provider and request a function to be attached to the data plane app tier. Code to run the function may be executed in the VMs and may not be configured to run anywhere else on the data plane VCN. Each VM may be connected to one customer tenancy. Respective containers (1)-(N) contained in the VMs may be configured to run the code. In this case, there can be a dual isolation (e.g., the containers running code, where the containers may be contained in at least the VM that are contained in the untrusted app subnet(s)) that may help prevent incorrect or otherwise undesirable code from damaging the network of the cloud infrastructure provider or from damaging a network of a different customer. The containers may be communicatively coupled to the customer tenancy and may be configured to transmit or receive data from the customer tenancy. The containers may not be configured to transmit or receive data from any other entity in the data plane VCN. Upon completion of running the code, the cloud infrastructure provider may dispose of the containers.

In accordance with an embodiment, the trusted app subnet(s) may run code that may be owned or operated by the cloud infrastructure provider. In this embodiment, the trusted app subnet(s) may be communicatively coupled to the DB subnet(s) and be configured to execute CRUD operations in the DB subnet(s). The untrusted app subnet(s) may be communicatively coupled to the DB subnet(s) and configured to execute read operations in the DB subnet(s). The containers that can be contained in the VM of each customer and that may run code from the customer may not be communicatively coupled with the DB subnet(s).

In accordance with an embodiment, the control plane VCN and the data plane VCN may not be directly communicatively coupled, or there may be no direct communication between the control plane VCN and the data plane VCN. However, communication can occur indirectly, wherein an LPG may be established by the cloud infrastructure provider that can facilitate communication between the control plane VCN and the data plane VCN. In another example, the control plane VCN or the data plane VCN can make a call to cloud services via the service gateway. For example, a call to cloud services from the control plane VCN can include a request for a service that can communicate with the data plane VCN.

Figure 6:
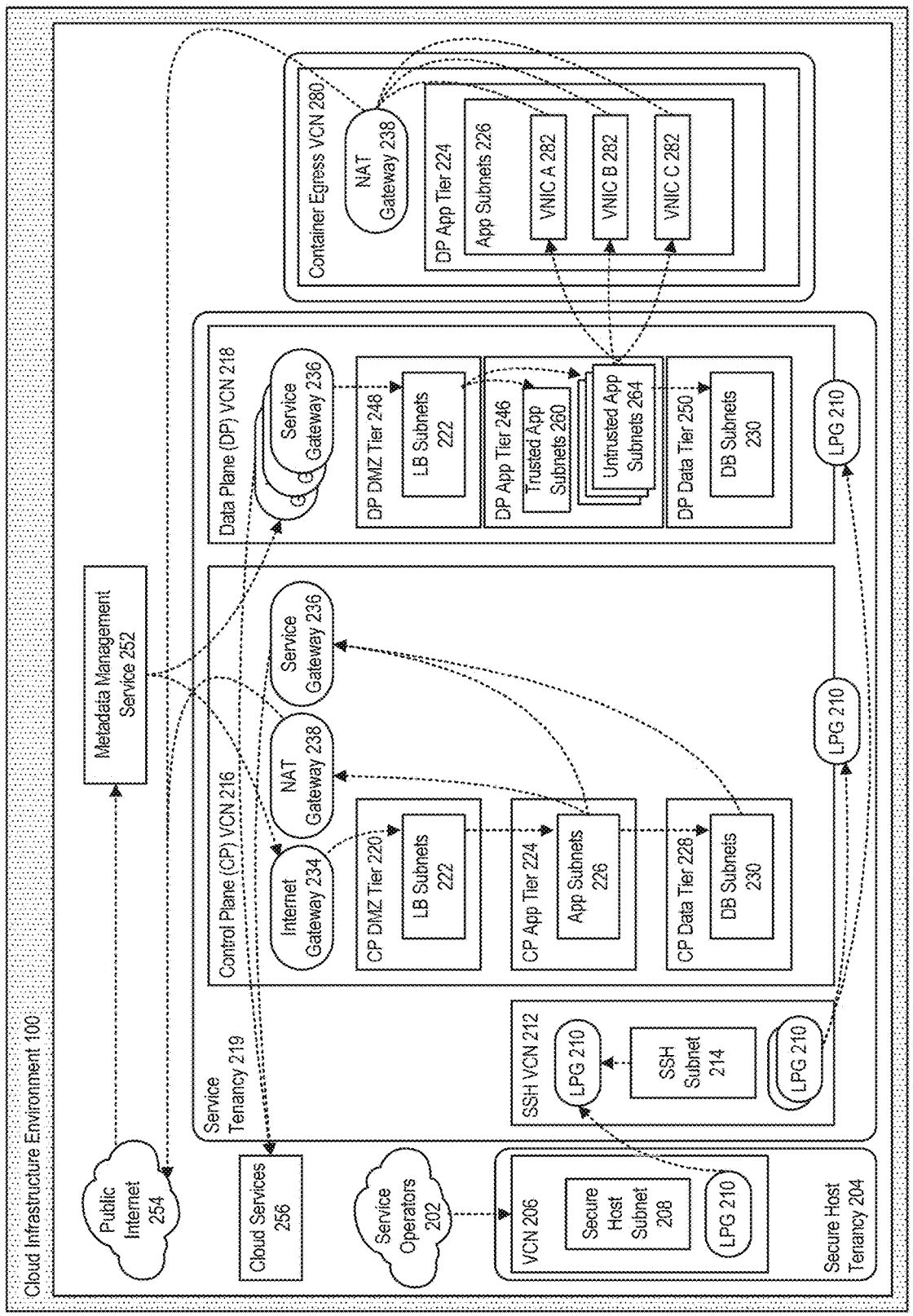
FIG. 6 illustrates another example of a cloud infrastructure architecture in accordance with an embodiment.

FIG. 6 illustrates another example of a cloud infrastructure architecture in accordance with an embodiment.

As illustrated in FIG. 6, in accordance with an embodiment, the trusted app subnet(s) can be communicatively coupled to the service gateway contained in the data plane VCN, the NAT gateway contained in the data plane VCN, and DB subnet(s) contained in the data plane data tier. The untrusted app subnet(s) can be communicatively coupled to the service gateway contained in the data plane VCN and DB subnet(s) contained in the data plane data tier. The data plane data tier can include DB subnet(s) that can be communicatively coupled to the service gateway contained in the data plane VCN.

In accordance with an embodiment, untrusted app subnet(s) can include primary VNICs that can be communicatively coupled to tenant virtual machines (VMs) residing within the untrusted app subnet(s). Each tenant VM can run code in a respective container and be communicatively coupled to an app subnet that can be contained in a data plane app tier that can be contained in a container egress VCN 280. Respective secondary VNICs 282 (1)-(N) can facilitate communication between the untrusted app subnet (s) contained in the data plane VCN and the app subnet contained in the container egress VCN. The container egress VCN can include a NAT gateway that can be communicatively coupled to the public Internet.

In accordance with an embodiment, the Internet gateway contained in the control plane VCN and contained in the data plane VCN can be communicatively coupled to a metadata management service that can be communicatively coupled to the public Internet. The public Internet can be communicatively coupled to the NAT gateway contained in the control plane VCN and contained in the data plane VCN. The service gateway contained in the control plane VCN and contained in the data plane VCN can be communicatively coupled to cloud services.

In accordance with an embodiment, the pattern illustrated in FIG. 6 may be considered an exception to the pattern illustrated in FIG. 5 and may be desirable for a customer if the cloud infrastructure provider cannot directly communicate with the customer (e.g., a disconnected region). The respective containers that are contained in the VMs for each customer can be accessed in real-time by the customer. The containers may be configured to make calls to respective secondary VNICs contained in app subnet(s) of the data plane app tier that can be contained in the container egress VCN. The secondary VNICs can transmit the calls to the NAT gateway that may transmit the calls to the public Internet. In this example, the containers that can be accessed in real-time by the customer can be isolated from the control plane VCN and can be isolated from other entities contained in the data plane VCN. The containers may also be isolated from resources from other customers.

In other examples, the customer can use the containers to call cloud services. In this example, the customer may run code in the containers that request a service from cloud services. The containers can transmit this request to the secondary VNICs that can transmit the request to the NAT gateway that can transmit the request to the public Internet. The public Internet can be used to transmit the request to LB subnet(s) contained in the control plane VCN via the Internet gateway. In response to determining that the request is valid, the LB subnet(s) can transmit the request to app subnet(s) that can transmit the request to cloud services via the service gateway.

It should be appreciated that IaaS architectures depicted in the above figures may have other components than those depicted. Further, the embodiments shown in the figures are some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner.

Private Label Cloud Environments

In accordance with an embodiment, a cloud infrastructure environment can be used to provide dedicated cloud environments, for example, as one or more private label cloud environments for use by tenants of the cloud infrastructure environment in accessing subscription-based software products, services, or other offerings associated with the cloud infrastructure environment.

Figure 7:
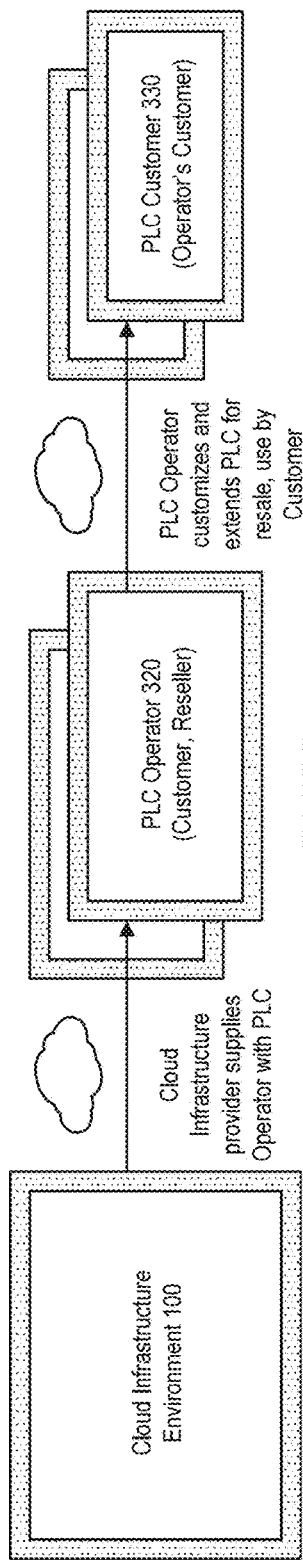
FIG. 7 illustrates how the system can provide dedicated or private label cloud environments for use by tenants or customers of a cloud infrastructure environment in accordance with an embodiment.

FIG. 7 illustrates how the system can provide dedicated or private label cloud environments for use by tenants or customers of a cloud infrastructure environment in accordance with an embodiment.

As illustrated in FIG. 7, in accordance with an embodiment, a cloud infrastructure provider (e.g., OCI) can supply a PLC operator 320, for example an OCI customer operating as a reseller, with one or more PLC environments. The PLC operator/reseller can then customize and extend the private label cloud for use by (their) customer 330 for use in accessing subscription-based software products, services, or other offerings associated with the cloud infrastructure environment.

For purposes of illustration, examples of such subscription-based products, services, or other offerings may include various Oracle Cloud Infrastructure software products, Oracle Fusion Applications products, or other types of products or services that allow customers to subscribe to usage of those products or services.

Figure 8:
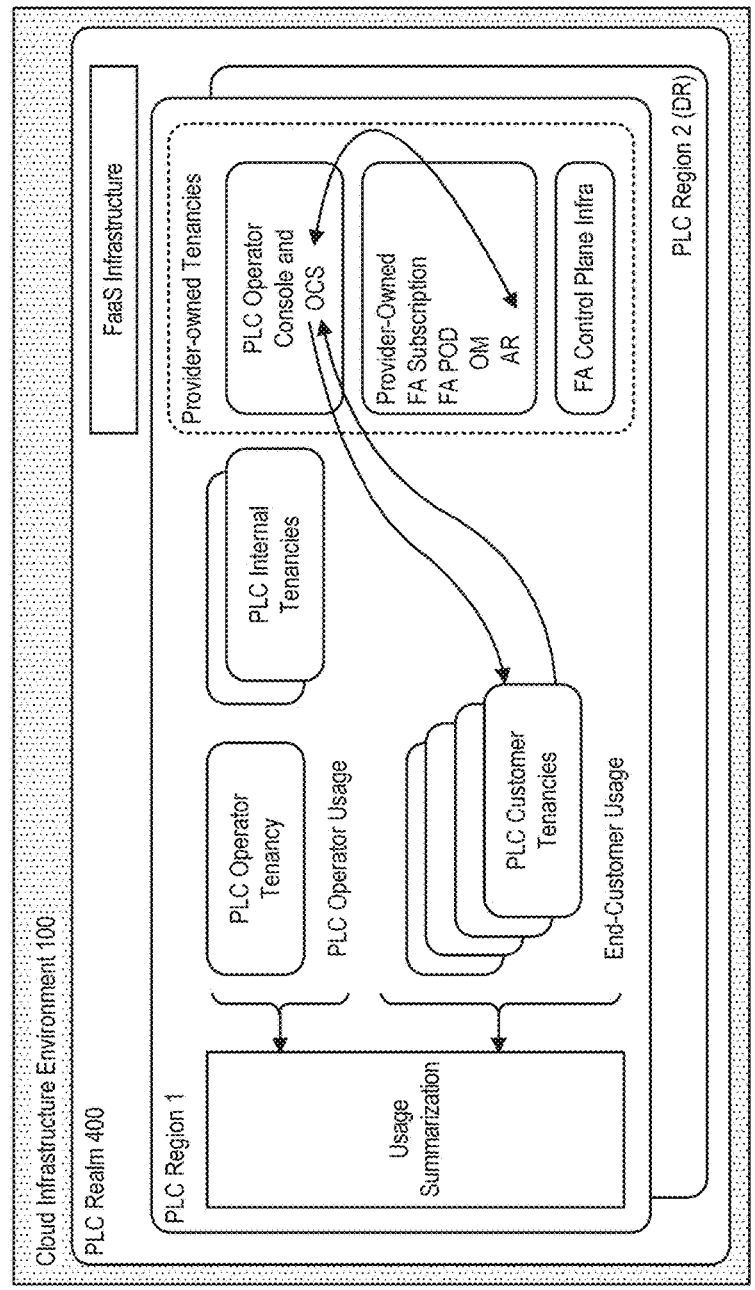
FIG. 8 further illustrates the use of private label cloud realms for use by tenants or customers of a cloud infrastructure environment in accordance with an embodiment.

FIG. 8 further illustrates the use of private label cloud realms for use by tenants or customers of a cloud infrastructure environment in accordance with an embodiment.

As illustrated in FIG. 8, in accordance with an embodiment, the system can include a cloud subscription service or component, such as an Oracle Cloud Subscriptions (OCS) service or component, that exposes one or more subscription management APIs for creating orders used to onboard new customers or to launch a workflow that creates a subscription and orchestrates billing and pricing service or other components for use with a PLC realm 400.

In accordance with an embodiment, when a PLC operator or their customer requests a PLC environment, the system creates a PLC realm for use with one or more provider-owned tenancies. A realm is a logical collection of one or more cloud regions that are isolated from each other and do not allow customer content to traverse realm boundaries to a region outside that realm. Each realm is accessed separately. PLC operators access cloud resources and services through a cloud tenancy. A cloud tenancy is a secure and isolated partition of a cloud infrastructure environment, and it only exists in a single realm. Within this tenancy, operators can access services and deploy workloads across all regions within that realm if policies allow.

In accordance with an embodiment, a first step in the process is to create an operator tenancy for the PLC operator before the realm and associated regions are turned over to them for subsequent management. The PLC operator then becomes the administrator of this tenancy with the ability to view and manage everything that happens within that realm, including their customer accounts and usage by those customers of cloud resources.

Generally, once the realm has been turned over or provided to the PLC operator, the cloud infrastructure provider cannot subsequently access the data within the operator tenancy unless the operator authorizes the cloud infrastructure provider to do so, for example, to provide troubleshooting for issues that may arise.

In accordance with an embodiment, the PLC operator can then create additional internal tenancies, intended for their own use internally, for example, to assess what the end customer experience will be, to provide a sales demo tenancy, or to operate a database for their own internal use. The operator can also create one or more customer tenancies that the end customer will be the administrator for. Cloud infrastructure usage metrics, for example, compute usage, storage usage, and usage of other infrastructure resources, may be consolidated by the operator, reflecting both operator usage and customer usage. Cloud infrastructure usage may be reported to the cloud infrastructure provider.

In accordance with an embodiment, a user interface or console can be provided that allows the PLC operator to manage its customer accounts and customer-offered services. A cloud infrastructure provider can also use a cloud infrastructure tenancy, for example, a Fusion Applications tenancy, to install any needed infrastructure services for use by the operator and their customers.

Figure 9:
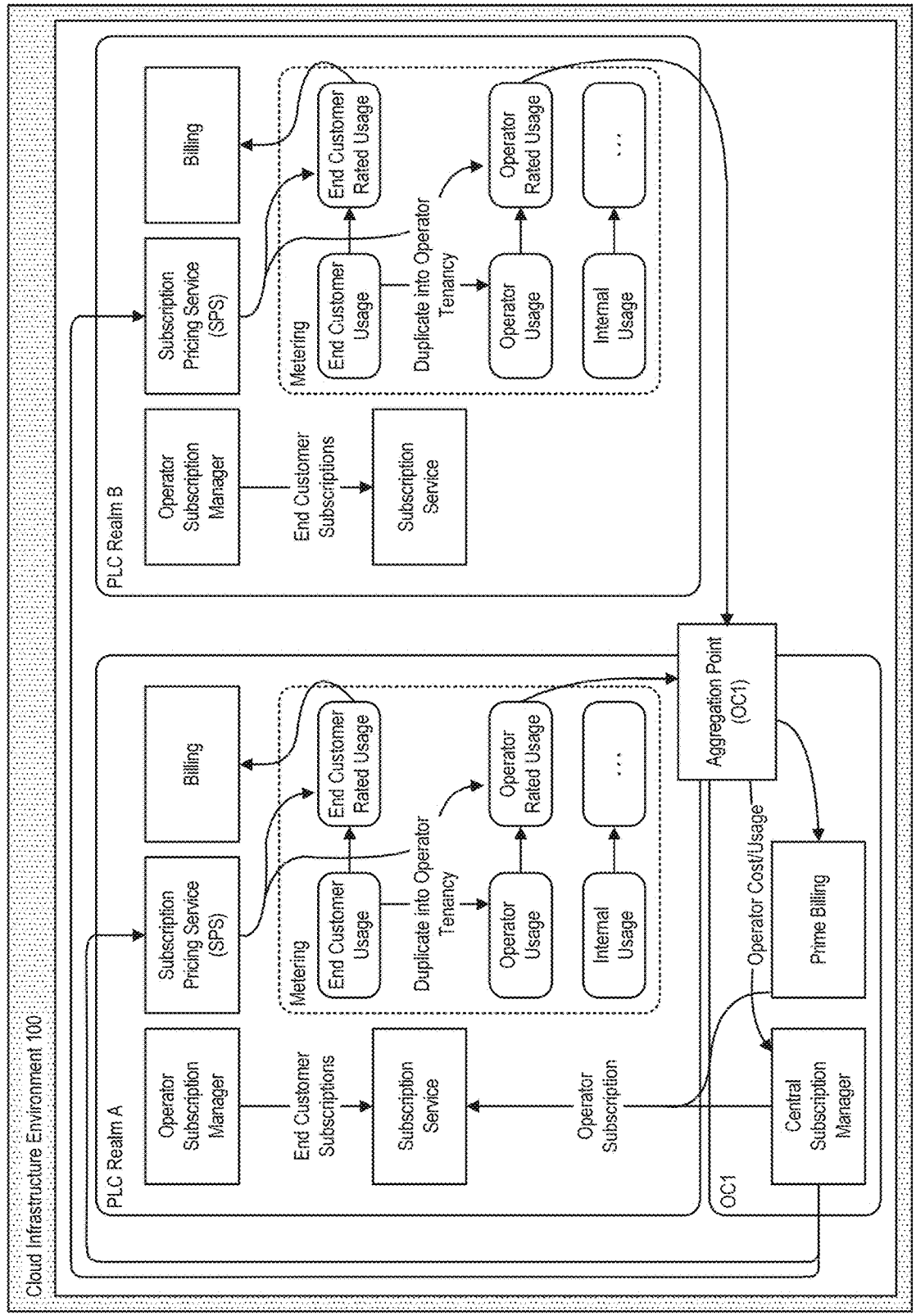
FIG. 9 further illustrates the use of private label cloud realms for use by tenants or customers of a cloud infrastructure environment in accordance with an embodiment.

FIG. 9 further illustrates the use of private label cloud realms for use by tenants or customers of a cloud infrastructure environment in accordance with an embodiment.

As illustrated in FIG. 9, in accordance with an embodiment, a cloud subscription service or component exposes one or more subscription management APIs for creating orders used to onboard new customers or to launch a workflow that creates a subscription and orchestrates billing and pricing services or other components.

In accordance with an embodiment, the system can also include a billing service or component that operates upon a billing account or logical container of subscriptions and preferences used to produce an invoice for a customer.

In accordance with an embodiment, the system can also include a subscription pricing service (SPS) or component that operates upon a product catalog that defines the products that can be purchased by a customer. The subscription pricing service can also be used to provide a price list (e.g., a rate card) that the pricing service also owns.

In accordance with an embodiment, to support the sales process used to create a subscription in a PLC realm, products can be selected from a product hub. Once an order is created, a subscription is created in cloud subscription service that thereafter manages the life cycle of that subscription and provisions what needs to be provisioned in downstream services. The SPS component then manages the aspects of pricing and usage for use in charging the end cost to the PLC operator or their ability to charge their customers. Usage events are forwarded to the billing service or component, where, depending on the billing preferences of the subscription, invoices are created and pushed to an accounts receivables component.

In accordance with an embodiment, although the services that are offered in a realm report their usage to a metering service or component, such usage does not have any price associated with it. A rating process determines how much each specific event costs, for example, by applying rate cards, determines a unit and cost for that subscription, associates the cost to that record, and then forwards that to the billing service or component.

As further illustrated in FIG. 9, in accordance with an embodiment, a PLC operator may control multiple realms A, B. For, example an operator that operates in multiple countries may wish to operate a data center that is completely isolated for the United States of America and a separate data center that is completely isolated for Europe, for example, to address governance or regulatory requirements. In accordance with an embodiment, the usage associated with these multiple realms can be aggregated for use in billing the operator.

The examples of various systems illustrated above are provided for purposes of illustrating a computing environment that can be used to provide dedicated or private label cloud environments for use by tenants of a cloud infrastructure in accessing subscription-based software products, services, or other offerings associated with the cloud infrastructure environment. In accordance with other embodiments, the various components, processes, and features described herein can be used with other types of cloud computing environments.

Private Label Cloud Subscriptions

Figure 10:
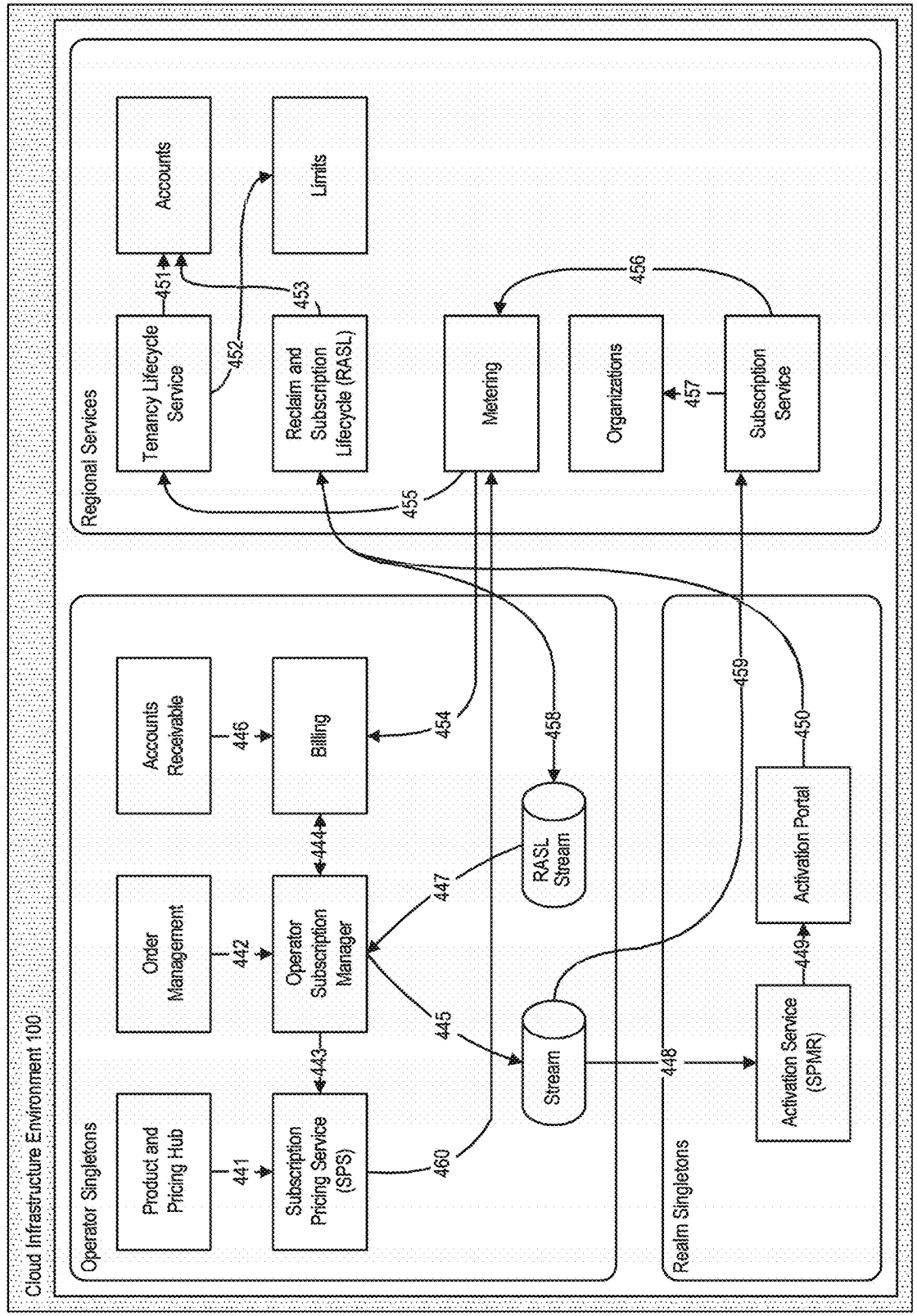
FIG. 10 illustrates a system for providing access to software products or services in a cloud computing or other computing environment in accordance with an embodiment.

FIG. 10 illustrates a system for providing access to software products or services in a cloud computing or other computing environment in accordance with an embodiment.

As illustrated in FIG. 10, in accordance with an embodiment, the system can be provided as a cloud computing or other computing environment, referred to herein in some embodiments as a platform, that supports the use of subscription-based products, services, or other offerings.

Examples of such subscription-based products, services, or other offerings may include various Oracle Cloud Infrastructure (OCI) software products, Oracle Fusion Applications products, or other types of products or services that allow customers to subscribe to usage of those products or services.

In accordance with an embodiment, a subscription can include artifacts, such as products, commits, billing model, and state. The cloud subscription service can expose one or more subscription management APIs for creating orders used to onboard new customers or to launch a workflow that creates a subscription and orchestrates creating the proper footprints in billing and pricing service or components as further described below.

In accordance with an embodiment, the billing service or component operates upon a billing account or logical container of subscriptions and preferences used to produce an invoice. Each billing account generates one or more invoices per billing cycle. The billing service includes a first pipeline that accepts usage and cost from a metering service or component. Usage may be accepted through a REST API or another interface. The billing service writes the usage to a database from which balances may be calculated and aggregated by the billing service or other services. The billing service may include a second pipeline responsible for taking the aggregated usage and commitments and calculating charges over one or more billing intervals.

In accordance with an embodiment, the subscription pricing service (SPS) or component operates upon a product catalog that defines the products that can be purchased by a customer. The product catalog forms the backbone of a price list (i.e., rate card) that the pricing service also owns. Rate cards are modeled as pricing rules on top of public list prices. The pricing service maintains a single price list for each product; new product prices can be added and existing prices changed. The price list has a full history, the latest version being the current rate card. Since some contracts may require a snapshot of the rate card be taken, the pricing service handles this by recording the time a customer's rate card is created and then querying the price list at that time.

In accordance with an embodiment, the SPS or pricing service is responsible for providing information about products, global price lists, and end customer subscription specific price lists and discounts. For example, in accordance with an embodiment, the SPS can synchronize product information from a product hub (e.g., an Oracle Fusion Product Hub) and a global price list from a pricing hub (e.g., an Oracle Fusion Pricing Hub).

In accordance with an embodiment, the cloud subscription service operates as an upstream service to receive new order requests, for example, from an Oracle Fusion Order Management environment. The cloud subscription service can provide subscription information to the SPS service. Subscription details like time of quote, configuration, and subscription type (Commitment, PayG) help SPS to determine an effective base price (Rate Card) for the subscription. The cloud subscription service can also send discounts for subscriptions received, for example, from Oracle Fusion Order Management, that SPS stores as a pricing rule entity.

In accordance with an embodiment, the SPS service runs as a background process to manage a rate cards service or component responsible for generating rate cards for new subscriptions and updating when new price changes occur. The SPS service can expose APIs to access rate cards and pricing rules. A metering in-line rating engine can utilize these APIs to get subscription-specific rate cards and pricing rules using this data for cost calculations.

In accordance with an embodiment, additional SPS components can include, for example, a Pricing/Product Hub Oracle Integration Cloud (OIC) integration component, that allows a PLC operator entity providing subscription-based products, services, or other offerings within the environment to manage their product and price list, for example, as provided by an Oracle Fusion Product Hub and Oracle Fusion Pricing Hub, respectively.

For example, in accordance with such an embodiment, an SPS OIC product integration flow can listen to create/update events in the Product Hub and make calls to an SPS product API. Similarly, an SPS OIC pricing integration flow can pull new price list creations from the Pricing Hub and call respective SPS pricing APIs.

In accordance with an embodiment, the system can also include an SPS core module that provides APIs to manage and access pricing entities. Pricing can be accessed by internal services, such as an inline rating engine.

In accordance with an embodiment, the system can also include a rate card manager component. The SPS service maintains the single base price for a product at a given time. However, product prices for subscriptions are dependent on a base price at quote configuration time and price list change policy attributes of subscriptions. The SPS service internally maintains the price to be used for subscriptions using these properties. Such price lists are grouped in a rate card. The rate card manager can create and maintain the rate card as well as listen to price list changes and update existing rate cards with the new price. It also listens to new subscriptions and assigns the rate card based on subscription properties.

In accordance with an embodiment, the system can also include a rule decoder engine. The SPS service is responsible for managing pricing rules for a subscription, including discounts offered to an end customer. Pricing rules eligibility can be based on attributes of Products, like Discount group, Product Category, or specific SKUs. Internally, SPS needs to identify the list of products these rules will be applicable. To accomplish this, the rule decoder engine can compile the pricing rules in a format such that an in-line rating engine can consume for cost calculation. This compilation process can be triggered when products or pricing rules get created/updated.

As illustrated by way of example in FIG. 10, in accordance with an embodiment: at 441, a product and price information managed in, e.g., Fusion Applications, is sent to the SPS component. At 442, orders are sent to the cloud subscription service component to create subscriptions, rate cards, and billing accounts. At 443, pricing configuration and pricing rules are sent to SPS for new orders. At 444, the cloud subscription service is used to set up a billing account in the billing service or component. At 445, the cloud subscription service publishes events to a cloud infrastructure streaming component. At 446, charge data is sent to an accounts receivable component to generate invoices. At 447, cloud subscription service consumes reclaim and subscription lifecycle (RASL) events from cloud infrastructure streaming. At 448, an activation service reads the cloud subscription service event stream. At 449, a customer gets activation data from a portal. At 450, a tenancy lifecycle service provisions a tenancy as part of the subscription activation. At 451, the tenancy lifecycle service creates an accounts footprint during account provisioning. At 452, the tenancy lifecycle service sets a limits template during account provisioning. At 453, the accounts component acts as a downstream RASL client to handle legacy reclamation. At 454, aggregated cost and usage is sent to the billing service or component. At 455, an organization can create child tenancies using the tenancy lifecycle service. At 456, a metering service or component gets subscription mapping data. At 457, the subscription service gets organization data for subscription mappings. At 458, RASL reads cloud subscription service event stream. At 459, the subscription service reads cloud subscription service event stream; and at 460, the metering service or component gets a rate card data for each subscription that can then be used in charging the end cost to the PLC operator or their ability to charge their customers.

The above example is provided for purposes of illustrating a computing environment that can be used to provide dedicated or private label cloud environments for use by tenants of a cloud infrastructure in accessing subscription-based software products, services, or other offerings associated with the cloud infrastructure environment. In accordance with other embodiments, the various components, processes, and features described herein can be used with other types of cloud computing environments.

3. System Architecture for Managing Resource Constraints

Figure 11A:
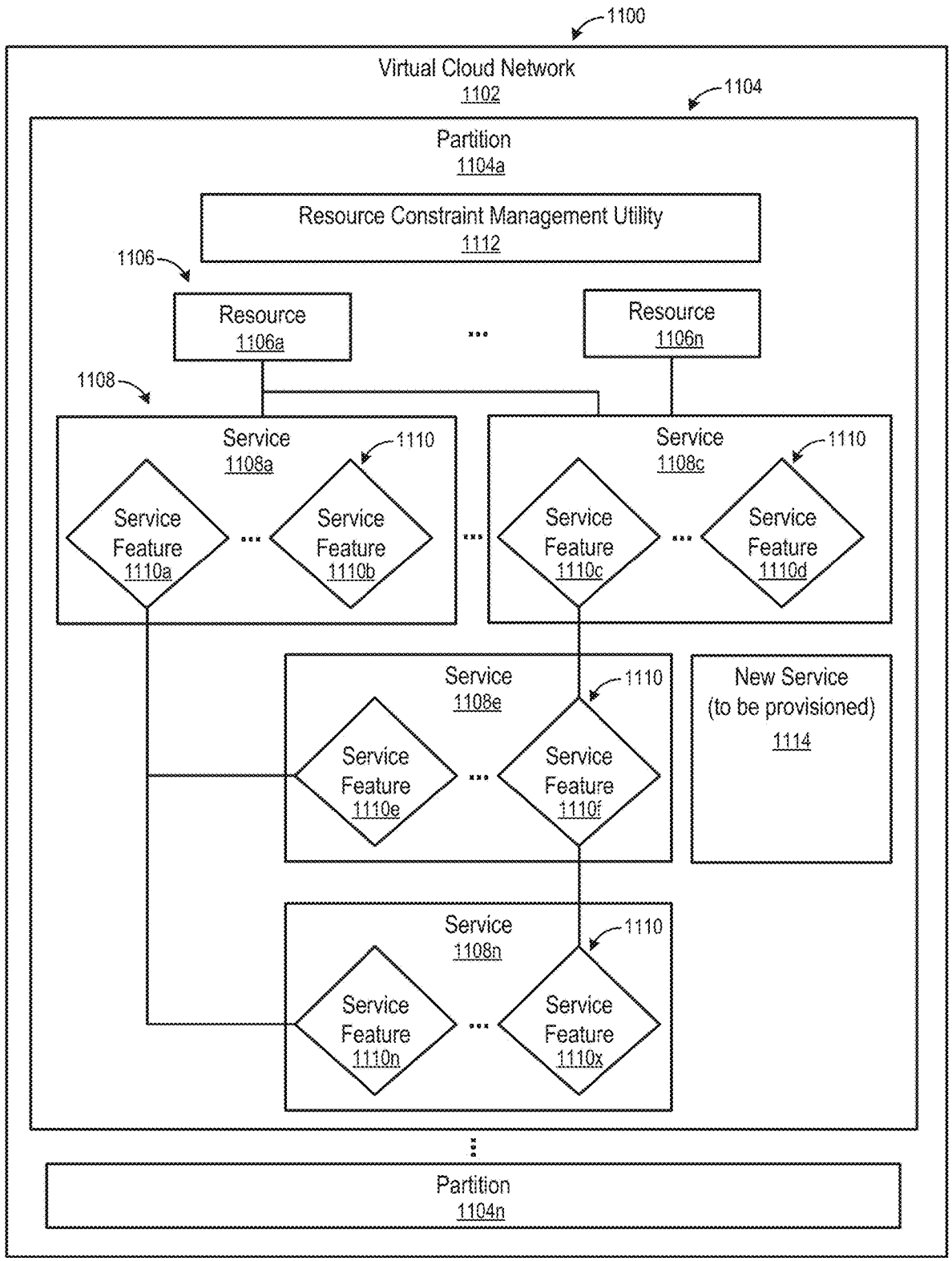
FIGS. 11A and 11B illustrate features of a system that includes a resource constraint management utility in accordance with one or more embodiments.
Figure 11B:
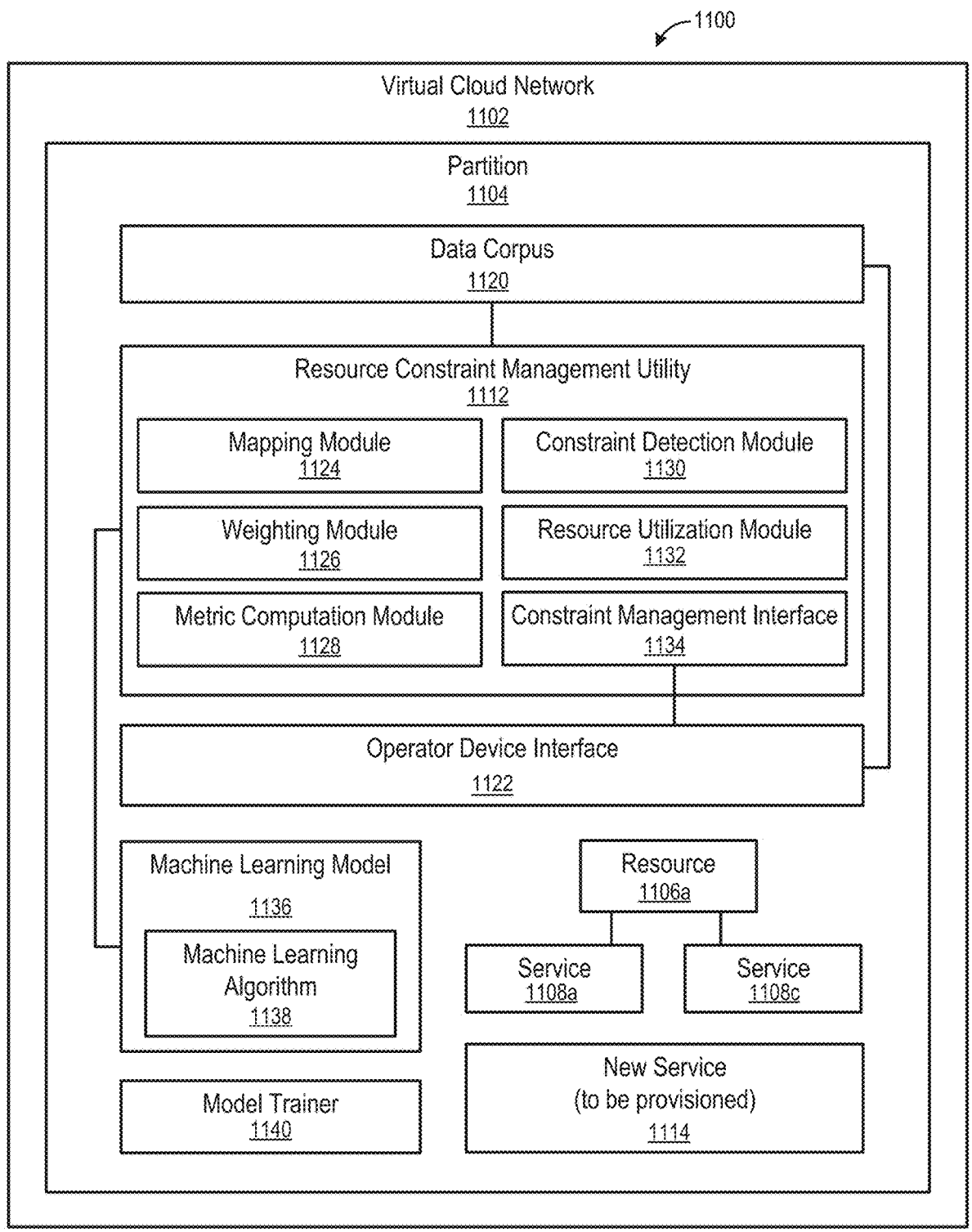

FIGS. 11A and 11B illustrate a system 1100 that includes features for managing resource constraints in a cloud environment in accordance with one or more embodiments. In one or more embodiments, the system 1100 refers to hardware and/or software configured to perform operations described herein. Examples of operations are described below with reference to FIG. 14. In addition to the features described with reference to FIGS. 11A and 11B, the system 1100 may include one or more features described above in Section 2, titled "Dedicated Or Private Label Cloud Environments."

In one or more embodiments, the system 1100 may include more or fewer components than the components described with reference to FIGS. 11A and 11B. The components described with reference to FIGS. 11A and 11B may be local to or remote from each other. The components described with reference to FIGS. 11A and 11B may be implemented in software and/or hardware. The components of system 1100 may be distributed over multiple applications and/or machines. Multiple components may be combined into one application and/or machine. Operations described with respect to one component may instead be performed by another component.

The system 1100 includes a virtual cloud network 1102. A plurality of partitions 1104 are deployed on the virtual cloud network 1102, such as partition 1104a and partition 1104n. The partitions 1104 represent logically or physically isolated portions of the virtual cloud network 1102. In one example, the partitions 1104 include tenant partitions, or tenancies, that isolate portions of the virtual cloud network 1102 between different entities, or tenants, such as PLC operators or customers. Additionally, or alternatively, the partitions 1104 may include service partitions that isolate different services or workloads. Additionally, or alternatively, the partitions 1104 may include geographic partitions that isolate a portion of the virtual cloud network 1102 corresponding to a particular geographic region. Additionally, or alternatively, the partitions 1104 may include network partitions that isolate the virtual cloud network 1102 into separate segments or subnets.

A. Example Resources, Services, and Service Features

As illustrated in FIG. 11A with respect to partition 1104a, a partition 1104 includes a plurality of resources 1106 and a plurality of services 1108 that respectively utilize one or more of the resources 1106. The plurality of services 1108, respectively, include a plurality of service features 1110. Additionally, the partition 1104 includes a resource constraint management utility 1112 that manages resource constraints associated with the partition 1104. In one example, the resource constraint management utility 1112 manages resource constraints associated with the partition 1104 based at least on weighting metrics that correspond to weights assigned to respective service features 1110 of the services 1108. The weights assigned to the service features 1110 may represent values of the service features 1110 within a given context. Additionally, or alternatively, the resource constraint management utility 1112 may monitor the health of the services 1108 and/or service features 1110 of the partition 1104. In one example, the resource constraint management utility 1112 manages resource constraints associated with the partition 1104 based at least on weighting metrics that correspond to the health of services 1108 and/or respective service features 1110 of the services 1108.

In one example, as shown in FIG. 11A, partition 1104a includes resource 1106a and resource 1106n. Additionally, partition 1104a includes service 1108a and service 1108c. Service 1108a utilizes resource 1106a. Service 1108c utilizes resource 1106a and resource 1106n. Service 1108a includes service feature 1110a and service feature 1110b. Service 1108c includes service feature 1110c and service feature 1110d. Additionally, partition 1104a includes service 1108e and service 1108n. Service 1108e and service 1108n utilize one or more of the resources 1106. Service 1108e includes service feature 1110e and service feature 1110f. Service 1108n includes service feature 1110n and service feature 1110x.

The resource constraint management utility 1112 determines resource constraints associated with one or more of the resources 1106. In one example, the resource constraint management utility 1112 determines a resource constraint associated with resource 1106a. Additionally, the resource constraint management utility 1112 determines a set of services 1108 that utilize the resource 1106 that has the resource constraint. In one example, the resource constraint management utility 1112 determines that service 1108a and service 1108c utilize resource 1106a. To alleviate the resource constraint, the resource constraint management utility 1112 selects a service 1108 for deprovisioning from partition 1104a. The resource constraint management utility 1112 selects a service 1108 for deprovisioning from partition 1104a from a set of services 1108 that utilize the resource 1106. The service 1108 is selected by the resource constraint management utility 1112 based on weighting metrics associated with service features 1110 of the services 1108 that utilize the resource 1106. In one example, the resource constraint management utility 1112 selects service 1108a for deprovisioning.

In one example, the resource constraint management utility 1112 receives a request to install a new service 1114 in partition 1104a. The resource constraint management utility 1112 determines that new service 1114 will utilize resource 1106a, and that resource 1106a has a resource constraint. In one example, resource 1106a may have insufficient capacity to accommodate new service 1114 being installed in the partition 1104a. The resource constraint management utility 1112 identifies service 1108a and service 1108c as candidates for deprovisioning and selects service 1108a for deprovisioning.

In one example, the resource constraint management utility 1112 determines a service 1108 for deprovisioning based on a weighting metric for service 1108a that corresponds to weights assigned to service feature 1110a and service feature 1110b of service 1108a. Additionally, or alternatively, the resource constraint management utility 1112 determines a service 1108 for deprovisioning based on a weighting metric for service 1108c that corresponds to weights assigned to service feature 1110c and service feature 1110d of service 1108c. Additionally, or alternatively, the resource constraint management utility 1112 determines a service 1108 for deprovisioning based on a weighting metric for service 1108e that corresponds to weights assigned to service feature 1110e and service feature 1110f of service 1108e. Additionally, or alternatively, the resource constraint management utility 1112 determines a service 1108 for deprovisioning based on a weighting metric for service 1108n that corresponds to weights assigned to service feature 1110n and service feature 1110x of service 1108n.

In one example, the resource constraint management utility 1112 determines the weighting metric for a service 1108 based on weights assigned to the one or more service features 1110 of the service 1108 that represent values of the respective service features within a given context. Additionally, or alternatively, the resource constraint management utility 1112 may determine the weighting metric for a service 1108 based on weights assigned to the one or more service features 1110 of the service 1108. The weights assigned to the one or more services features 1110 may represent impacts that the service features 1110 have on one or more other service features 1110 arranged downstream.

As illustrated in FIG. 11A, service feature 1110e of service 1108e is arranged downstream from service feature 1110a of service 1108a. Service feature 1110e depends on service feature 1110a. In one example, a functionality of service feature 1110e depends on a functionality of service feature 1110a. Additionally, service feature 1110n of service 1108n is arranged downstream from service feature 1110a of service 1108a. Service feature 1110n depends on service feature 1110a. In one example, a functionality of service feature 1110n depends on a functionality of service feature 1110a. The functionalities of service feature 1110a may include generating one or more outputs that are utilized as an input by service feature 1110e and/or by service feature 1110n. Additionally, or alternatively, the functionalities of service feature 1110a may include executing one or more operations that directly or indirectly impact service feature 1110e and/or service feature 1110n. Additionally, or alternatively, service feature 1110e and/or service feature 1110n may be arranged subsequent to service feature 1110a with respect to a data flow or a sequence of operations. The resource constraint management utility 1112 may determine the weighting metric for service 1108a based at least in part on (a) an impact that service feature 1110a has on service feature 1110e as a result of a dependency between service feature 1110a and service feature 1110e and/or (b) an impact that service feature 1110a has on service feature 1110n as a result of a dependency between service feature 1110a and service feature 1110n.

As further illustrated in FIG. 11A, service feature 1110f of service 1108e is arranged downstream from service feature 1110c of service 1108c, and service feature 1110x of service 1108n is arranged downstream from service feature 1110f of service 1108e. Service feature 1110f depends on service feature 1110c. In one example, a functionality of service feature 1110f depends on a functionality of service feature 1110c. The functionalities of service feature 1110c may include generating one or more outputs that are utilized as an input by service feature 1110f and/or executing one or more operations that directly or indirectly impact service feature 1110f. Additionally, or alternatively, service feature 1110f may be arranged subsequent to service feature 1110c with respect to a data flow or a sequence of operations. Additionally, service feature 1110x depends on service feature 1110f. In one example, a functionality of service feature 1110x depends on a functionality of service feature 1110f. The functionalities of service feature 1110f may include generating one or more outputs that are utilized as an input by service feature 1110x and/or executing one or more operations that directly or indirectly impact service feature 1110x. Additionally, or alternatively, service feature 1110x may be arranged subsequent to service feature 1110f with respect to a data flow or a sequence of operations. Additionally, service feature 1110x depends indirectly from service feature 1110c. Service feature 1110c indirectly impacts service feature 1110x. The resource constraint management utility 1112 may determine the weighting metric for service 1108c based at least in part on an impact that service feature 1110c has on service feature 1110f and/or service feature 1110x. Additionally, or alternatively, the resource constraint management utility 1112 may determine the weighting metric for service 1108c and/or the weighting metric for service 1108e based, at least in part, on an impact that service feature 1110f has on service feature 1110x.

In one example, the resource constraint management utility 1112 may determine the weighting metric for a service 1108 based on weights assigned to the one or more service features 1110 of the service 1108 that represent impacts that one or more service features 1110 arranged upstream have on one or more service features 1110 of the service 1108. As illustrated in FIG. 11A, service feature 1110a of service 1108a is arranged upstream from service feature 1110e of service 1108e and service feature 1110n of service 1108n. Service feature 1110a impacts service feature 1110e as a result of a dependency between service feature 1110a and service feature 1110e. Additionally, or alternatively, service feature 1110a impacts service feature 1110n as a result of a dependency between service feature 1110a and service feature 1110n. The resource constraint management utility 1112 may determine the weighting metric for service 1108e based, at least in part, on an impact that service feature 1110a has on service feature 1110e. Additionally, or alternatively, the resource constraint management utility 1112 may determine the weighting metric for service 1108$n$ based at least in part on an impact that service feature 1110$a$ has on service feature 1110$n$.

As further illustrated in FIG. 11A, service feature 1110$f$ of service 1108$e$ is arranged upstream from service feature 1110$x$ of service 1108$n$, and service feature 1110$c$ of service 1108$c$ is arranged upstream from service feature 1110$f$. Service feature 1110$f$ impacts service feature 1110$x$ as a result of a dependency between service feature 1110$f$ and service feature 1110$x$. Service feature 1110$c$ impacts service feature 1110$f$ as a result of a dependency between service feature 1110$c$ and service feature 1110$f$. The resource constraint management utility 1112 may determine the weighting metric for service 1108$e$ based, at least in part, on an impact that service feature 1110$c$ has on service feature 1110$f$. Additionally, or alternatively, the resource constraint management utility 1112 may determine the weighting metric for service 1108$n$ based, at least in part, on an impact that service feature 1110$f$ and/or service 1108$c$ have on service feature 1110$x$.

The term "downstream," as used herein with reference to an arrangement of a first service feature downstream from a second service features, refers to at least one of the following: (a) the first service feature being arranged subsequent to the second service feature with respect to a data flow or a sequence of operations, (b) the first service feature being dependent upon a functionality of the second feature such as an output of the second service feature that the first service feature utilizes as an input, or (c) an operation executed by the second service feature that directly or indirectly impacts the first service feature.

The term "upstream," as used herein with reference to an arrangement of a first service feature upstream from a second service features, refers to at least one of the following: (a) the first service feature being arranged prior to the second service feature with respect to a data flow or a sequence of operations, (b) the first service feature having a functionality that the second feature depends upon such as an output of the first service feature that the second service feature utilizes as an input, or (c) an operation executed by the first service feature that directly or indirectly impacts the second service feature.

The term "dependent" or "dependency," as used herein with reference to a first service feature being dependent upon, or having a dependency from, a second service features, refers to at least one of the following: (a) the first service feature being arranged subsequent to the second service feature with respect to a data flow or a sequence of operations, (b) the first service feature being dependent upon a functionality of the second feature such as an output of the second service feature that the first service feature utilizes as an input, or (c) an operation executed by the second service feature that directly or indirectly impacts the first service feature. In one example, a downstream service feature is dependent upon an upstream service feature.

As used herein, the term "resource" refers to a hardware or software component that is utilized to build, maintain, or operate a cloud infrastructure and/or services deployed in the cloud infrastructure. A hardware resource may include one or more of the following: a server, a processor, a memory device, a storage device, a networking device, a power supply device, or a cooling system device. A cooling system device may include one or more of the following: an air conditioning system, a heating system, a ventilation system, a heat exchanger, or an airflow device. A software resource may include one or more of the following: an operating system, a cloud management platform, a security platform, a development tool, a compute instance, a virtual machine, a container, or a storage system. Additionally, or alternatively, a resource may include a service deployed in a cloud infrastructure. In one example, one or more services deployed in the cloud infrastructure are resources with respect to one or more other services in the cloud infrastructure.

The term "resource constraint," as used herein with reference to a resource, refers to a limitation or restriction associated with the resource that at least partially inhibits or prevents utilization of the resource with respect at least one utilization characteristic. The utilization characteristics of a resource constraint may include one or more of the following: a utilization threshold, a physical limitation, a performance limitation, a capacity plan, an allocation policy, a cost limitation, or an efficiency parameter. A resource constraint may be represented by a percentage or a quantity. A resource constraint associated with a resource may be determined by comparing a utilization of the resource to one or more limits or restrictions for utilizing the resource with respect to one or more utilization characteristics. A resource constraint may be determined with respect to a current, scheduled, or predicted utilization. In one example, a resource has a resource constraint when the resource is currently being utilized, is scheduled to be utilized, or is predicted to be utilized in a manner that meets a limitation or restriction that at least partially inhibits or prevents utilization of the resource with respect at least one utilization characteristic. Additionally, or alternatively, a resource constraint may be determined with respect to a proposed utilization. In one example, a resource has a resource constraint when a proposed utilization, alone or together with a current, scheduled, or predicted utilization, would result in a utilization of the resource in a manner that meets a limitation or restriction that at least partially inhibits or prevents utilization of the resource with respect at least one utilization characteristic. A resource constraint may be determined with respect to finite deterministic scenarios and/or probabilistic scenarios. In one example, a resource has a resource constraint when a utilization scenario definitively meets a limitation or restriction that at least partially inhibits or prevents utilization of the resource with respect to at least one utilization characteristic. In one example, a resource has a resource constraint when a utilization scenario satisfies a probability threshold for meeting a limitation or restriction that at least partially inhibits or prevents utilization of the resource with respect at least one utilization characteristic.

As used herein, the term "service" refers to a modular, self-contained unit of functionality that is deployed in a cloud infrastructure. A service may encapsulate a specific set of functionalities, utilities, or tasks. A service may include a unit of functionality ranging from a simple standalone application or utility to a complex distributed system that includes multiple interconnected components. A service may include a well-defined interface for interaction with other services, service features, or operator device interfaces.

In one example, a service includes a compute instance, a virtual machine, a container, or a storage system. Additionally, or alternatively, a service includes an application, a program, a utility, a resource, a platform, an infrastructure as a service (IaaS), a platform as a service (PaaS), a software as a service (SaaS), a database as a service (DBaaS), a container orchestration service, a serverless computing service, a storage service, a content delivery network (CDN) service, an identity and access management (IAM) service, a networking service, a machine learning or AI service, a big data or analytics service, an internet of things (IoT) service, a blockchain service, a monitoring or logging service, a customized service, or a customer-specific service.

An IaaS may include one or more of the following: virtual machines, compute instances, or cloud servers. A PaaS may include one or more of the following: application hosting, application services, or cloud-native application platforms. A SaaS may include one or more of the following: email and productivity suites, office applications, or collaboration tools. A DBaaS may include one or more of the following: a managed database, a database service, or a database platform. A container orchestration service may include one or more of the following: a container orchestration platform or a cluster management service. A serverless computing service may include one or more of the following: a function as a service (FaaS) or a serverless computing architecture. A storage service may include one or more of the following: object storage, block storage, or file storage. A CDN services may include one or more of the following: a content delivery service, a content caching service, a streaming and media delivery service, or a content automation service. An IAM service may include one or more of the following: an authentication or authorization service, an identity management service, or a federated identity service. A networking service may include one or more of the following: a VPC service or a software-defined networking (SDN) service. A machine learning service may include one or more of the following: a machine learning platform, a model training service, an automated model selection or configuration service, an AI integration service, a model monitoring or management services, or a deep learning service. A big data or analytics service may include one or more of the following: a data warehousing service, an analytics platform, or a data lake service. An IoT service may include one or more of the following: an IoT platform, a device management service, or an edge computing service. A blockchain service may include one or more of the following: a blockchain platform, a distributed ledger service, a smart contracts service, a security or cryptography service, or a tokenization service. A monitoring or logging service may include one or more of the following: a monitoring service, a logging service, or an application performance monitoring service.

As used herein, the term "service feature" refers to a feature, functionality, capability, characteristic, parameter, or facet of a service. A service feature may contribute to an operation, output, state, or quality of a service. A service feature may pertain to build time and/or run-time of a service. In one example, a service may be a service feature with respect to one or more other services.

In one example, a service feature, such as a service feature that pertains to build-time of a service, includes one or more of the following: a dependency management feature, a build automation feature, a code compilation feature, a code quality feature, a unit testing feature, an artifact generation feature, a configuration management feature, a continuous integration feature, a code packaging feature, a dependency scanning feature, a documentation generation feature, a code obfuscation feature, a versioning feature, a tagging feature, or a build-time optimization feature.

Additionally, or alternatively, a service feature, such as a service feature that pertains to the run-time of a service, includes one or more of the following: a deployment feature, an authentication feature, an authorization security feature, an encryption feature, a compliance feature, a content delivery feature, a content caching feature, a logging feature, an auditing feature, a disaster recovery feature, a scalability feature, a virtualization feature, an automation feature, a machine learning integration feature, a reliability feature, an availability feature, a fault tolerance feature, a data redundancy feature, a response time feature, a throughput capacity feature, a data encryption feature, a performance monitoring feature, a performance optimization feature, a resource utilization feature, a load balancing feature, or a patch management feature.

Additionally, or alternatively, a service feature, such as a service feature that pertains to both run-time and build-time of a service, includes one or more of the following: a resource management feature, an error handling and logging feature, a dynamic configuration feature, a thread management feature, a session management feature, a caching feature, a connection pooling feature, or an adaptive security feature.

B. Example Resource Constraint Management Utility

Referring to FIG. 11B, an example resource constraint management utility 1112 is further described in accordance with one or more embodiments. FIG. 11B illustrates features of a system 1100 that includes a virtual cloud network 1102 with a partition 1104 deployed in the virtual cloud network 1102. The partition 1104 includes one or more resources 1106 and one or more services 1108 that respectively utilize one or more of the resources 1106. As an example, FIG. 11B shows resource 1106a and service 1108a and service 1108c that utilize resource 1106a. The system 1100 described with reference to FIG. 11B may include one or more additional components, features, or functionalities described with reference to FIG. 11A.

As shown in FIG. 11B, the partition 1104 includes a resource constraint management utility 1112, a data corpus 1120, and an operator device interface 1122. The resource constraint management utility 1112 determines resource constraints associated with resources 1106. Additionally, the resource constraint management utility 1112 determines sets of services 1108 as candidates for deprovisioning in response to resource constraints and selects services for deprovisioning from the sets of candidates. The resource constraint management utility 1112 may determine the resource constraints, the sets of candidates, and/or the services 1108 for deprovisioning based at least in part on one or more datasets stored in the data corpus 1120. The datasets stored in the data corpus 1120 may be generated based on inputs from an operator device interface 1122. Additionally, or alternatively, datasets stored in the data corpus 1120 may be generated based on alarm data pertaining to alarm parameters obtained from a telemetry service and/or a messaging service. An example data corpus 1120 is further described with reference to FIGS. 12A-12C.

The resource constraint management utility 1112 may include one or more of the following: a mapping module 1124, a weighting module 1126, a metric computation module 1128, a constraint detection module 1130, or a resource utilization module 1132. Additionally, the resource constraint management utility 1112 includes a constraint management interface 1134. An example constraint management interface 1134 is further described with reference to FIG. 15.

In one example, a system 1100 that includes one or more components of the resource constraint management utility 1112 is deployed to the virtual cloud network 1102 concurrently with, or subsequent to, deploying the partition 1104 to the virtual cloud network 1102. In one example, a first entity deploys the partition 1104 and the system 1100, including the one or more components of the resource constraint management utility 1112, and then transfers operation of the partition 1104 to a second entity. In one example, the first entity is a cloud infrastructure provider, and the second entity is a PLC operator or customer. The second entity utilizes the resource constraint management utility 1112 in connection with operating the partition 1104. In one example, the second entity accesses the constraint management interface 1134 of resource constraint management utility 1112, for example, to input and/or retrieve information pertaining to operations of the resource constraint management utility 1112. In one example, the first entity and the second entity are distinguishable based on identity resources for the cloud environment. A set of identity resources for the cloud environment may include a first identity domain corresponding to the first entity and a second identity domain corresponding to the second entity. The partition 1104, including the resource constraint management utility 1112 deployed to the partition 1104, is accessible in accordance with the second identity domain corresponding to the second entity.

i. Example Mapping Module

In one example, the mapping module 1124 generates mappings associated with resources 1106, services 1108, service features 1110, and/or alarm parameters. In one example, the mappings may identify a set of services 1108 that utilize a particular resource 1106 and/or a set of resources 1106 that are utilized by a particular service 1108. Additionally, or alternatively, the mappings may indicate alarm parameters that correspond to service features 1110 and/or service features that correspond to services 1108. The mappings may define relationships, dependencies, and/or communication channels between resources 1106 and services 1108. Additionally, or alternatively, the mappings may define relationships, dependencies, and/or communication channels between alarm parameters and service features 1110 and/or between service features 1110 and services 1108. In one example, the mappings are generated based on inputs from an operator via the operator device interface 1122. Additionally, or alternatively, the mapping module 1124 may include one or more mapping utilities that generate mappings, including mappings between resources 1106 and services 1108, between alarm parameters and service features 1110, and/or between service features 1110 and services 1108. The one or more mapping utilities may include a service discovery utility, a configuration management utility, an orchestration platform, or an event-driven architecture utility. In one example, the mapping module 1124 utilizes the one or more mapping utilities to dynamically update mappings. The mappings may be dynamically updated as different resources 1106, services 1108, and/or as services features 1110 are provisioned and/or deprovisioned in the partition 1104. Example mappings are further described with reference to FIG. 12A.

In one example, the mapping module 1124 generates dependency graphs that indicate dependencies between services 1108 and/or service features 1110. In one example, a dependency graph may include a plurality of dependencies between different service features 1110. Additionally, or alternatively, a dependency graph may include a plurality of dependencies between different services 1108. In one example, the dependency graphs are generated based on inputs from an operator via the operator device interface 1122. Additionally, or alternatively, the mapping module 1124 may include one or more dependency graph utilities that generate dependency graphs between service features 1110 and/or services 1108. The one or more dependency graph utilities may include a service discovery utility, a configuration management utility, an orchestration platform, or an event-driven architecture utility. In one example, the mapping module 1124 utilizes the one or more dependency graph utilities to dynamically update dependency graphs. The dependency graphs may be dynamically updated as different services 1108 and/or services features 1110 are provisioned and/or deprovisioned in the partition 1104. Example dependency graphs are further described with reference to FIGS. 12B and 12C.

ii. Example Weighting Module

The weighting module 1126 assigns weights to various weighted items. The weighted items may include services 1108, service features 1110, and/or alarm parameters. Additionally, or alternatively, the weighted items may include mappings, dependencies, and/or nodes. A weight assigned to a weighted item may represent a degree of importance, significance, value, or impact of the weighted item within a given context. A relatively higher weight may indicate that a weighted item is relatively more important, more significant, more valuable, or more impactful. A relatively lower weight may indicate that a weighted item is relatively less important, less significant, less valuable, or less impactful. The weights assigned to weighted items may be stored in the data corpus 1120. In one example, the weights are stored in association with the mappings and/or dependency graphs stored in the data corpus 1120.

In one example, a weight that is assigned to a weighted item (e.g., a service 1108, service feature 1110, or alarm parameter) may represent an importance or value of the weighted item to one or more components or operations of the cloud environment. A weight assigned to a service feature 1110 of a service 1108 may represent an importance or value of the service feature 1110 to the service 1108. A weight assigned to a service 1108 may represent an importance or value of the service 1108 to one or more operational aspects of the cloud environment. Additionally, or alternatively, a weight assigned to a service 1108 may represent an importance or value of the service 1108 to one or more business activities that depend on the service 1108.

In one example, a weight that is assigned to a weighted item (e.g., a service 1108, service feature 1110, or alarm parameter) may represent an impact or significance of the weighted item to one or more components or operations of the cloud environment. A weight assigned to an alarm parameter may represent an impact or significance of the alarm parameter to a service feature 1110 that is mapped to the alarm parameter. Additionally, or alternatively, a weight assigned to a service feature 1110 of a service 1108 may represent an impact or significance of the service feature 1110 to one or more corresponding services 1108. Additionally, or alternatively, a weight assigned to a service feature 1110 of a service 1108 may represent an impact or significance of the service feature 1110 to one or more downstream service features 1110.

The weighting module 1126 may assign the weights to various nodes, mappings, and/or dependencies. The weight assigned to a particular node may depend on one or more adjacent nodes. In one example, an alarm parameter that is associated with a first service feature 1110 and a second service feature 1110 may have a first weight with respect to the first service feature 1110 and a second weight with respect to the second service feature 1110. The difference in weight between the first service feature 1110 and the second service feature 1110 may indicate that the alarm parameter is more important, more significant, more valuable, or more impactful to the first service feature 1110 than the second service feature 1110. In one example, a service feature 1110 is mapped to a first alarm parameter that is assigned first weight and a second alarm parameter that is assigned a second weight. Additionally, the first weight is greater than the second weight. The first weight being greater than the second weight indicates that an importance, significance, value, or impact of the first alarm parameter with respect to the service feature 1110 is greater than that of the second alarm parameter with respect to the service feature 1110.

In one example, a service 1108 is mapped to a first service feature 1110 that is assigned a first weight and a second service feature 1110 that is assigned a second weight. Additionally, the first weight is greater than the second weight. The first weight being greater than the second weight indicates that an importance, significance, value, or impact of the first service feature 1110 with respect to the service 1108 is greater than that of the second service feature 1110 with respect to the service 1108. In one example, an upstream service feature 1110 may have a first weight with respect to a first downstream service feature 1110 and a second weight with respect to a second downstream service feature 1110. The difference in weight between the first downstream service feature 1110 and the second downstream service feature 1110 may indicate that the upstream service feature 1110 is more important, more significant, more valuable, or more impactful to the first downstream service feature 1110 than the second downstream service feature 1110. Additionally, or alternatively, a downstream service feature 1110 may have a first weight with respect to a first upstream service feature 1110 and a second weight with respect to a second upstream service feature 1110. The difference in weight between the first upstream service feature 1110 and the second upstream service feature 1110 may indicate that an importance, significance, value, or impact of the first upstream service feature 1110 with respect to the downstream service feature 1110 is greater than that of the second upstream service feature on the downstream service feature 1110.

In one example, the weights assigned to weighted items (e.g., a service 1108, a service feature 1110, or an alarm parameter) are generated based on inputs from an operator via the operator device interface 1122. The weighted items may include user-defined weights, such as a user-defined valuation, a user-defined importance, a user-defined significance, and/or a user-defined impact. The user-defined weights may differ between different partitions. In one example, different tenants, such as PLC operators or customers, may provide different user-defined weights for different services and/or different instances of a service. A tenant may determine the user-defined weights based on the context of the services, service features, cloud operations, or business activities of the tenant. In one example, the weighted items may include user-defined business values. A user-defined business value of a weighted item may represent the importance, significance, value, or impact of the weight item on the business or operations of tenant. The relative importance, significance, value, or impact of various weight items may differ between different tenants, for example, based on differences in businesses or operations between different tenants and/or based on differences in priorities between different tenants.

In one example, the weighting module 1126 may include one or more weighting utilities that generate weights for different weighted items. The one or more weighting utilities may dynamically update weights for weighted items. The weighted items may be dynamically updated based on parameters of the cloud environment. In one example, the weighting module 1126 dynamically updates the weights for one or more weighted items based on one or more of the following types of parameters: events, states, log entries, metrics, thresholds, algorithms, or patterns. In one example, the weighting module 1126 dynamically updates the weights for one or more weighted items based on an operational state, and/or a change in an operational state, of one or more services 1108 and/or service features 1110 corresponding to the weighted item. For example, the weighting module 1126 may dynamically update a weight for a service feature 1110 in response to a service 1108 initiating use of the service feature 1110 and/or in response to the service suspending or terminating use of the service feature 1110. The weighting module 1126 may detect a transition of the service feature from a stopped or paused operational state to an initialization or running operational state or vice versa. The weighting module 1126 may assign a relatively low weight to the service feature 1110 when in the stopped or paused operational state, for example, based on the service feature 1110 not being utilized by the service 1108. The relatively low weight may indicate that the service feature 1110 has relatively low importance, significance, value, or impact when the service feature is in a stopped or paused operational state. The weighting module 1126 may assign a relatively high weight to the service feature 1110 when in the initialization or running operational state, for example, based on the service feature 1110 being utilized by the service 1108. The relatively high weight may indicate that the service feature 1110 has relatively high importance, significance, value, or impact when the service feature is in an initialization or running operational state. As another example, the weighting module 1126 may assign yet another weight to a service feature in response to determining a transition from an initialization or running operational state to an error or updating operational state. The weighting module 1126 may detect a transition of the service feature from the initialization or running operational state to the error or updating operational state or vice versa. The difference in weighting may represent a difference in importance, significance, value, or impact of the service as between the initialization or running operational state and the error or updating operational state.

In one example, the weighting module 1126 may utilize a machine learning model to determine weights and/or weighting metrics for various weighted items. Example machine learning models are further described below. Example weighting metrics are further described below with reference to FIGS. 13A and 13B.

iii. Example Metric Computation Module

The metric computation module 1128 computes metrics for the various services 1108 and/or service features 1110. In one example, the metric computation module 1128 computes weighting metrics associated with services 1108 and/or service features 1110, for example, based at least in part on weights assigned to weighted items by the weighting module 1126. Example weighting metrics are further described below with reference to FIGS. 13A and 13B. Additionally, or alternatively, the metric computation module 1128 may compute the health metrics based on alarm data pertaining to alarm parameters obtained from a telemetry service and/or a messaging service. Additionally, or alternatively, the metric computation module 1128 may compute weighting metrics based at least in part on health metrics associated with services 1108 and/or service features 1110.

In one example, the metric computation module 1128 computes a weighting metric for a service 1108 based on weights assigned to one or more service features 1110 of the service 1108. Additionally, or alternatively, the metric computation module 1128 may compute weighting metrics for a service 1108 based on weights assigned to one or more upstream service features 1110 and/or one or more downstream service features 1110 that share a dependency with a particular service feature 1110 of the service 1108. In one example, the metric computation module 1128 computes a weighting metric for a service 1108 based on a health metric determined for the service and/or for one or more service features 1110 of the service 1108. Additionally, or alternatively, the metric computation module 1128 may compute weighting metrics for a service 1108 based on health metrics determined for one or more upstream service features 1110 and/or one or more downstream service features 1110 that share a dependency with a service feature 1110 of the service 1108.

The metric computation module 1128 may store weighting metrics for various services 1108 in the data corpus 1120. Additionally, or alternatively, the metric computation module 1128 may transmit weighting metrics to the resource utilization module 1132, for example, for determining utilization scenarios for utilizing resources 1106 based on the weighting metrics.

iv. Example Constraint Detection Module

The constraint detection module 1130 determines resource constraints associated with resources 1106. In one example, the constraint detection module 1130 may determine resource constraints in response to a request to initiate a provisioning process for provisioning a service 1108. Additionally, or alternatively, the constraint detection module 1130 may determine resource constraints associated with fluctuating usage of resources 1106 in the cloud environment.

The constraint determination module 1130 may monitor utilization of a resource 1106 based on information obtained from the resource 1106, for example, via a telemetry service and/or a messaging service. Additionally, or alternatively, the constraint detection module 1130 may compute scheduled utilization of a resource 1106 based on resource utilization schedule. One or more resource utilization schedules for various resources 1106 may be stored in the data corpus 1120. Additionally, or alternatively, the constraint detection module 1130 may compute predicted utilization of a resource 1106, for example, utilizing one or more machine learning models. Example machine learning models are further described below. The constraint detection module 1130 determines whether a resource 1106 has a resource constraint based on the current, scheduled, or predicted utilization of the resource 1106.

In one example, the constraint detection module 1130 determines whether a resource 1106 has a resource constraint by comparing the current, scheduled, or predicted utilization of the resource 1106 to a utilization limit or restriction for utilizing the resource 1106. Additionally, or alternatively, the constraint detection module 1130 determines whether a resource 1106 has a resource constraint by comparing a proposed utilization of the resource 1106, alone or together with a current, scheduled, or predicted utilization of the resource 1106, to a utilization limit or restriction for utilizing the resource 1106. Utilization limits or restrictions for various resources 1106 may be stored in the data corpus 1120 and/or in metadata associated with the respective resources 1106.

The constraint detection module 1130 provides information pertaining to resource constraints associated with various resources 1106 to the resource utilization module 1132. Additionally, or alternatively, the constraint detection module 1130 may provide information pertaining to current, scheduled, or predicted utilization of the resource 1106 to the resource utilization module 1132. In one example, the constraint detection module 1130 may transmit a message to the constraint detection module 1130 in response to determining a resource constraint associated with a resource 1106. The message may identify the resource and a set of services 1108 that utilize the resource 1106. The constraint detection module 1130 may determine the set of services 1108 that utilize the resource 1106 based on mappings stored in the data corpus 1120.

v. Example Resource Utilization Module

The resource utilization module 1132 determines scenarios for utilizing resources 1106 based at least in part on information pertaining to resource constraints and/or utilization of the resources 1106. The resource utilization module 1132 may obtain the information pertaining to resource constraints and/or utilization of the resources 1106 from the constraint detection module 1130. Additionally, or alternatively, the resource utilization module 1132 may determine scenarios for utilizing resources 1106 based at least in part on weighting metrics obtained from the metric computation module 1128 and/or from the data corpus 1120.

To alleviate a resource constraint associated with a resource 1106, the resource utilization module 1132 may select one or more services 1108 for deprovisioning from a set of candidate services that utilize the resource 1106. The set of candidate services may include all or a portion of the services 1108 that utilize the resource 1106. The resource utilization module 1132 may select the one or more services 1108 for deprovisioning based on the weighting metrics corresponding, respectively, to the candidate services. In one example, the resource utilization module 1132 may select a service 1108 for deprovisioning that has a lower weighting metric relative to one or more other candidate services. The lower weighting metric of the service 1108 may indicate that deprovisioning the service 1108 may have less of an impact, for example, on operations performed in the partition of the cloud environment and/or on business activities that depend on operations performed in the partition of the cloud environment.

In one example, the resource utilization module 1132 may determine an extent to which deprovisioning the respective candidate services may alleviate the resource constraint. The resource utilization module 1132 may compute alleviation factors, respectively, for the candidate services that represent an extent to which deprovisioning a particular candidate services may alleviate the resource constraint. The resource utilization module 1132 may select the one or more services 1108 for deprovisioning based on the alleviation factors corresponding, respectively, to the candidate services. In one example, the resource utilization module 1132 may select a service 1108 for deprovisioning that has a higher alleviation factor relative to one or more other candidate services. Additionally, or alternatively, the resource utilization module 1132 may select a service 1108 for deprovisioning based on a combination of the weighting metrics and the alleviation factors corresponding, respectively, to the candidate services. The resource utilization module 1132 may select one or more services 1108 for deprovisioning that sufficiently alleviate the resource constraint. Based on the one or more services 1108 selected, the deprovisioning of the one or more services 1108 may have a relatively low impact on operations performed in the partition of the cloud environment and/or on business activities that depend on operations performed in the partition of the cloud environment.

The resource utilization module 1132 may select one or more services 1108 for deprovisioning to alleviate a resource constraint associated with a request to initiate a provisioning process for provisioning a service 1108. Additionally, or alternatively, the resource utilization module 1132 may select one or more services 1108 for deprovisioning to alleviate a resource constraint associated with current, scheduled, or predicted utilization of resources 1106 in the cloud environment. In one example, upon having selected one or more services 1108 for deprovisioning, the resource utilization module 1132 may initiate a deprovisioning process to deprovision the one or more services 1108. The deprovisioning process may include deprovisioning operations that depend on the particular service being deprovisioned. The deprovisioning operations for deprovisioning a service 1108 may include one or more of the following: backing up and/or exporting data associated with the service 1108, notifying stakeholders that the service 1108 is being deprovisioned, obtaining approval from stakeholders to deprovision the service 1108, scheduling a time for deprovisioning the service 1108, disabling and/or redirecting network traffic associated with the service 1108, scaling down utilization of the service 1108, terminating execution of the service 1108, or releasing resources 1106 associated with the service 1108.

vi. Constraint Management Interface

The constraint management interface 1134 generates and displays visual representations of various information pertaining to utilizing various resources 1106 and/or resource constraints associated with various resources 1106. The information generated and displayed by the constraint management interface 1134 may include an indication that a resource 1106 has a resource constraint. Additionally, the information generated and displayed by the constraint management interface 1134 may include an indication of one or more services 1108 that utilize the resource 1106. Additionally, the information generated and displayed by the constraint management interface 1134 may include weighting metrics, alleviations factors, rankings, and operational statuses, respectively, for the one or more services 1108 that utilize the resource 1106. An example constraint management interface 1134 is further described below with reference to FIG. 15.

C. Example Operator Device Interface

In one example, the operator device interface 1122 is communicatively coupled or couplable with the resource constraint management utility 1112. The operator device interface 1122 may include hardware and/or software configured to facilitate interactions between an operator and the resource constraint management utility 1112 and/or other aspects of the system 1100. The operator device interface 1122 may render user interface elements and receive input via user interface elements. For example, the operator device interface 1122 may display outputs generated by the resource constraint management utility 1112. Additionally, or alternatively, the operator device interface 1122 may be configured to receive inputs to the resource constraint management utility 1112. Examples of interfaces include a GUI, a command line interface (CLI), a haptic interface, or a voice command interface. Examples of user interface elements include checkboxes, radio buttons, dropdown lists, list boxes, buttons, toggles, text fields, date and time selectors, command lines, sliders, pages, or forms. Any one or more of these interfaces or interface elements may be utilized by the operator device interface 1122.

In an embodiment, different components of an operator device interface 1122 are specified in different languages. The behavior of user interface elements is specified in a dynamic programming language such as JavaScript. The content of user interface elements is specified in a markup language, such as hypertext markup language (HTML) or XML User Interface Language (XUL). The layout of user interface elements is specified in a style sheet language such as Cascading Style Sheets (CSS). Alternatively, the operator device interface 1122 may be specified in one or more other languages, such as Java, C, or C++.

In one example, the resource constraint management utility 1112 may be implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a browser device.

D. Example Machine Learning Models

Referring further to FIG. 11B, in one example, the resource constraint management utility 1112 may include and/or utilize at least one machine learning model 1136. As shown in FIG. 11B, machine learning model 1136 is shown as being located within partition 1104. Additionally, or alternatively, a machine learning model 1136 utilized by the resource constraint management utility may be located elsewhere in the virtual cloud network 1102. The resource constraint management utility 1112 may utilize a machine learning model 1136 to generate mappings, for example, between resources 1106 and services, between alarm parameters and service features 1110, and/or between service features 1110 and services 1108. Additionally, or alternatively, the resource constraint management utility 1112 may utilize a machine learning model 1136 to generate dependency graphs for service features 1110 and/or services 1108. Additionally, or alternatively, the resource constraint management utility 1112 may utilize a machine learning model 1136 to determine weights for weighted items (e.g., alarm parameters, service features 1110, and/or services 1108). Additionally, or alternatively, the resource constraint management utility 1112 may utilize a machine learning model 1136 to determine alleviation factors for services 1108 that utilize a resource 1106 that represent an extent to which deprovisioning a particular service may alleviate a resource constraint associated with the resource 1106. Additionally, or alternatively, the resource constraint management utility 1112 may utilize a machine learning model 1136 to predict resource constraints for resources 1106 and/or to select services 1108 for deprovisioning to alleviate resource constraints.

A machine learning algorithm 1138 may include one or more machine learning algorithms 1138, such as supervised algorithms and/or unsupervised algorithms. Various types of algorithms may be used, such as linear regression, logistic regression, linear discriminant analysis, classification and regression trees, naïve Bayes, k-nearest neighbors, learning vector quantization, support vector machine, bagging, and random forest, boosting, backpropagation, and/or clustering. Additionally, or alternatively to a machine learning model 1136, the resource constraint management utility 1112 may utilize one or more classical models. A classical model may include one or more classical statistical algorithms that rely on a set of assumptions about one or more of the underlying data, the data generating process, or the relationships between the variables. Example classical statistical algorithms may include linear regression, logistic regression, ANOVA (analysis of variance), or hypothesis testing.

In one example, a machine learning algorithm 1138 can be iterated to learn a target model f that best maps a set of input variables to an output variable. In particular, a machine learning algorithm 1138 may be configured to generate and/or train a machine learning model 1136. A machine learning algorithm 1138 may be iterated to learn a target model f that best maps a set of input variables to an output variable using a set of training data. Training data used by a machine learning algorithm 1138 may be stored in the data corpus 1120. The training data may include datasets and associated labels. The datasets may be associated with input variables for the target model f. The associated labels may be associated with the output variable of the target model f. The training data may be updated based on, for example, feedback on the accuracy of the current target model f. Updated training data may be fed back into the machine learning algorithm 1138 that, in turn, updates the target model f.

A machine learning algorithm 1138 may generate a target model f such that the target model f best fits the datasets of training data to the labels of the training data. Additionally, or alternatively, a machine learning algorithm 1138 may generate a target model f such that when the target model f is applied to the datasets of the training data, a maximum number of results determined by the target model f matches the labels of the training data. Different target models may be generated based on different machine learning algorithms 1138 and/or different sets of training data.

In one example, as shown in FIG. 11B, the resource constraint management utility 1112 may include a model trainer 1140 that utilizes one or more machine learning algorithms 1138 to generate and/or train a machine learning model 1136. In one example, the model trainer 1140 may obtain and/or generate feedback from one or more of the machine learning models 1136. The model trainer 1140 may train, update, and/or retrain one or more of the machine learning models 1136 based at least in part on the feedback. The feedback may correspond to one or more outputs of at least one machine learning model 1136. In one example, the model trainer 1140 may obtain a plurality of training datasets. The model trainer 1140 may train a machine learning model 1136 utilized by the resource constraint management utility 1112 based at least in part on the plurality of training datasets.

The training datasets may be stored in the data corpus 1120. In one example, the training data may include outputs from one or more of the machine learning models 1136. For example, a machine learning model 1136 may be iteratively trained and/or retrained based at least in part on outputs generated by one or more of the machine learning models 1136. A machine learning model 1136 may be iteratively improved over time as additional datasets are analyzed by the machine learning model 1136 to produce additional outputs, and the machine learning model 1136 is iteratively trained or retrained based on the additional outputs.

In one example, the training data may include one or more initial supervised learning datasets. The model trainer 1140 may train a machine learning model 1136 based at least in part on the one or more initial supervised learning datasets. In one example, the training data may include one or more subsequent supervised learning datasets. The model trainer 1140 may update or retrain the machine learning model 1136 based on one or more subsequent supervised learning datasets. The one or more subsequent supervised learning datasets may be generated based at least in part on feedback corresponding to one or more outputs of the machine learning model 1136.

E. Example Data Corpus

Figure 12A:
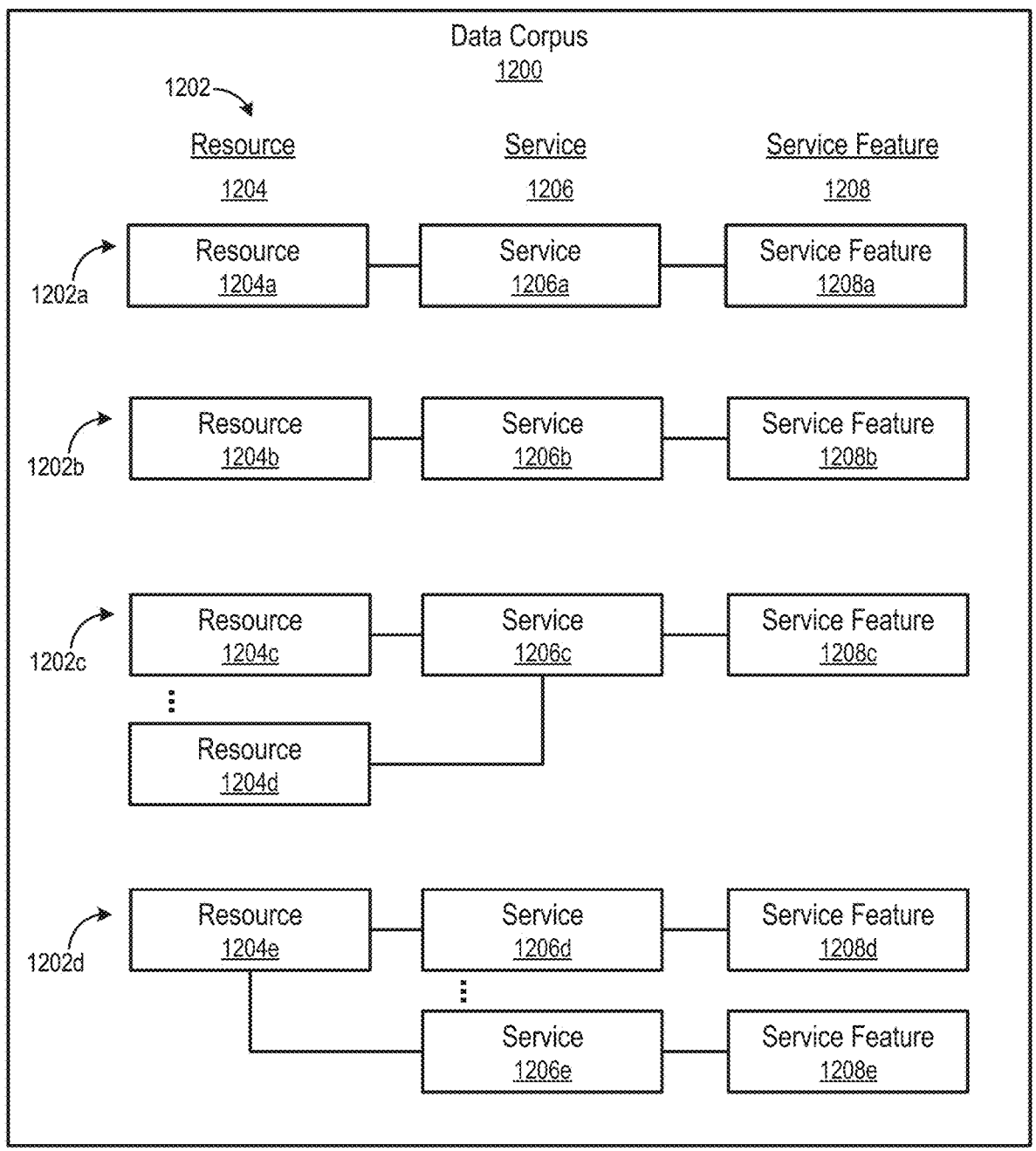
FIG. 12A illustrates example mappings of resources to services and of services to service features in accordance with one or more embodiments.
Figure 12B:
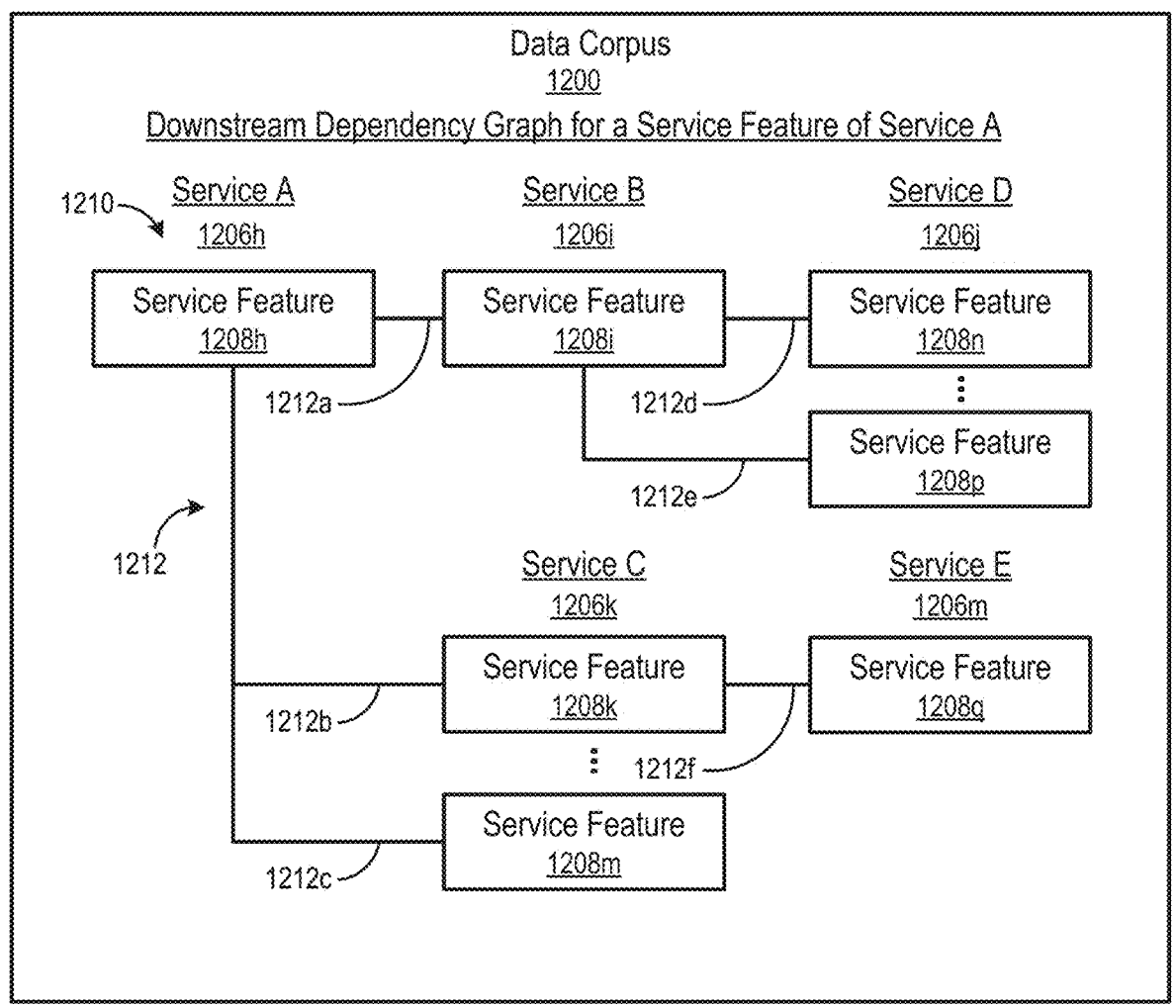
FIGS. 12B and 12C illustrate example dependency graphs that include dependencies between service features in accordance with one or more embodiments.
Figure 12C:
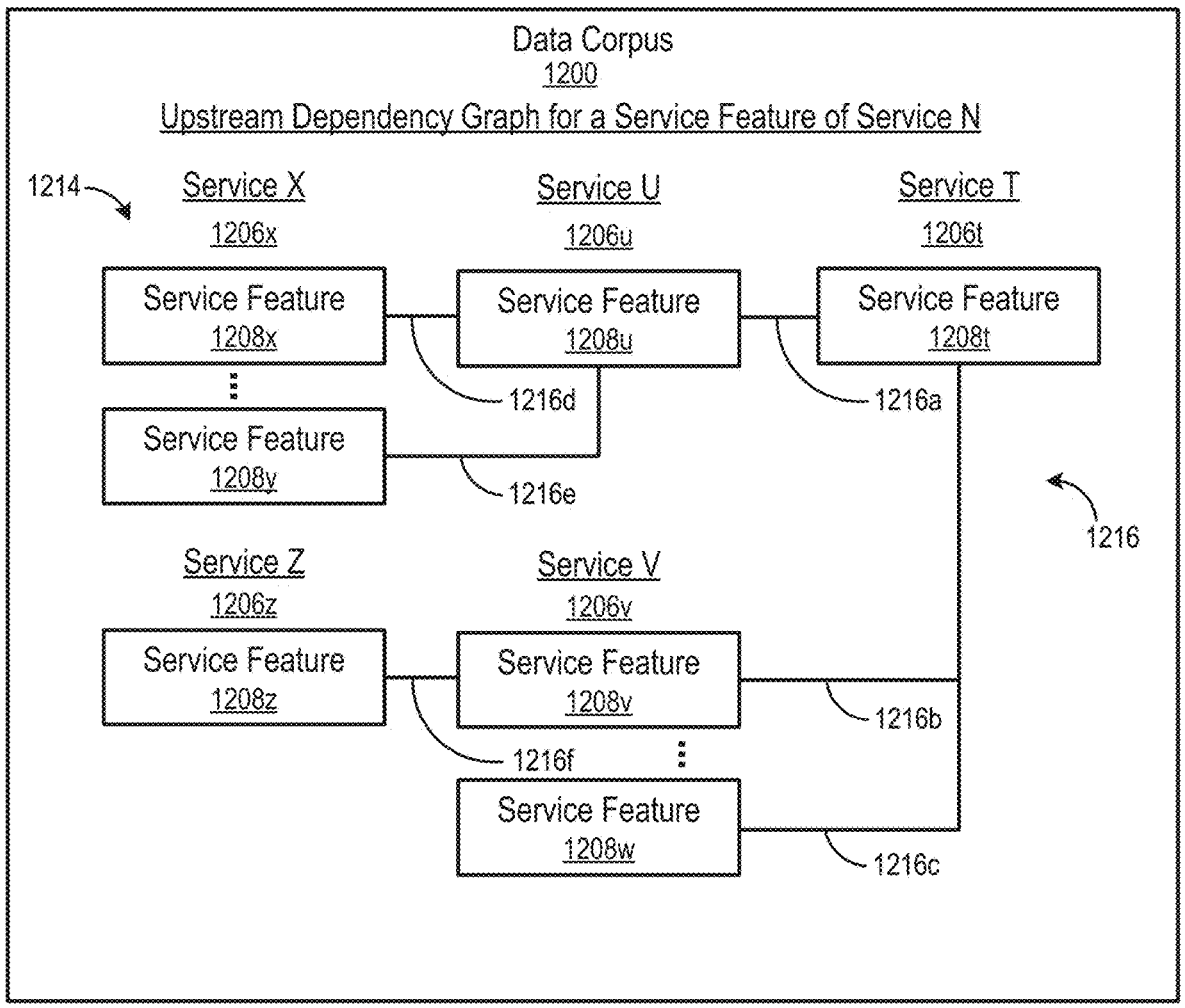

FIGS. 12A-12C illustrate features of an example data corpus 1200. The data corpus 1200 described with reference to FIGS. 12A-12C may be included in one or more embodiments described with reference to FIGS. 11A and 11B. Additionally, or alternatively, one or more features of the data corpus 1120 described with reference to FIGS. 11A and 11B may be included in the data corpus 1200 described with reference to FIGS. 12A-12C.

i. Example Mappings of Resources to Service and Services Features

As shown in FIG. 12A, a data corpus 1200 includes a plurality of mappings 1202. The plurality of mappings 1202 include mapped relationships between resources 1204 and services 1206. Additionally, the plurality of mappings 1202 include mapped relationships between services 1206 and service features 1208. The mapped relationships between resources 1204 and services 1206 identify particular services 1206 that utilize a particular resource 1204 and/or a set of resources 1204 that are utilized by a particular service 1206. The mapped relationships between service features 1208 and services 1206 identify particular service features 1208 of a particular service 1206.

In one example, the data corpus 1200 includes mappings 1202 of a particular service 1206 to a particular resource 1204. As one example, mapping 1202a maps service 1206a to resource 1204a. Additionally, mapping 1202a maps service feature 1208a to service 1206a. As another example, mapping 1202b maps service 1206b to resource 1204b. Additionally, mapping 1202b maps service feature 1208b to service 1206b. Additionally, or alternatively, the data corpus 1200 may include mappings 1202 that map a particular service 1206 to a plurality of resources 1204 utilized, respectively, by the particular service 1206. As one example, mapping 1202c maps service 1206c to resource 1204c and resource 1204d. Additionally, mapping 1202c maps service feature 1208c to service 1206c. Additionally, or alternatively, the data corpus 1200 may include mappings 1202 that map a particular resource 1204 to a plurality of services 1206 that respectively utilize the particular resource 1204. As one example, mapping 1202d maps resource 1204e to service 1206d and 1206e. Additionally, mapping 1202d maps service feature 1208d to service 1206d and service feature 1208e to service 1206e.

The mappings 1202 stored in the data corpus 1200 represent all or a subset of relationships between resources 1204 and services 1206 for a particular service 1206. Additionally, or alternatively, the mappings 1202 stored in the data corpus 1200 represent all or a subset of services 1206 deployed in a partition. In one example, the data corpus 1200 includes a particular set of mappings 1202 that are determined to be of particular interest for monitoring resource constraints in the cloud environment. The data corpus 1200 may include mappings 1202 that are defined by a user such as a cloud operator. The mappings 1202 that are defined by a user may correspond to particular resources 1204, services 1206, and/or service features 1208 that are of interest to the user. Additionally, or alternatively, the data corpus 1200 may include mappings 1202 that are automatically generated by a mapping utility. The mappings 1202 that are automatically generated by a mapping utility may correspond to particular resources 1204, services 1206, and/or service features 1208 that the mapping utility determines may be of interest to a user such as a cloud operator.

ii. Example Dependency Graphs

Referring to FIGS. 12B and 12C, the data corpus 1200 may include a plurality of dependency graphs that map functional dependencies between service features. A dependency graph represents dependencies associated with a one or more service features 1208. In one example, the dependency graphs may include downstream dependency graphs 1210 that represent downstream dependencies 1212 for one or more service features 1208. The downstream dependencies 1212 for a particular service feature 1208 indicate downstream service features 1208 that are dependent upon, or impacted by, or one or more functionalities or operations of the particular service feature 1208. Additionally, or alternatively, in one example, the dependency graphs may include upstream dependency graphs 1214 that represent upstream dependencies 1216 for one or more service features 1208.

FIG. 12B illustrates an example downstream dependency graph 1210 for service feature 1208h of service 1206h. The downstream dependency graph 1210 illustrated in FIG. 12B represents downstream dependencies 1212 for service feature 1208h. The downstream dependencies 1212 identify service features 1208 that are dependent upon, or impacted by, service feature 1208h of service 1206h. As one example, the downstream dependency graph 1210 includes downstream dependency 1212a between service feature 1208h and service feature 1208i of service 1206i. Downstream dependency 1212a indicates that service feature 1208i is dependent upon, or impacted by, service feature 1208h. As another example, downstream dependency 1212b and downstream dependency 1212c indicate, respectively, that both service feature 1208k and service feature 1208m of service 1206k are dependent upon, or impacted by, service feature 1208h.

The downstream dependencies 1212 may include one or more downstream service features 1208 that are dependent upon, or impacted by, a particular service feature 1208 that is dependent upon, or impacted by, another service feature 1208. As one example, the downstream dependency graph 1210 includes downstream dependency 1212d between service feature 1208i of service 1206i and service feature 1208n of service 1206j as well as downstream dependency 1212e between service feature 1208i and service feature 1208p. Together, downstream dependency 1212a and downstream dependency 1212d indicate that service feature 1208n is dependent upon, or impacted by, service feature 1208h. Additionally, downstream dependency 1212a and downstream dependency 1212e indicate that service feature 1208p is dependent upon, or impacted by, service feature 1208h. Service feature 1208n and/or service feature 1208p may respectively be indirectly dependent upon service feature 1208h by virtue of the dependency from service feature 1208i indicated, respectively, by downstream dependency 1212d and downstream dependency 1212e. As another example, downstream dependency 1212f between service feature 1208k of service 1206k and service feature 1208q of service 1206m indicate that service feature 1208p is dependent upon, or impacted by, service feature 1208h. Service feature 1208q may be indirectly dependent upon service feature 1208h by virtue of the dependency from service feature 1208k indicated by downstream dependency 1212f.

FIG. 12C illustrates an example upstream dependency graph 1214 for service feature 1208t of service 1206t. The upstream dependency graph 1214 illustrated in FIG. 12C represents upstream dependencies 1216 for service feature 1208t. The upstream dependencies 1216 identify service features 1208 that service feature 1208t of service 1206t depends upon or that impact service feature 1208t. As one example, the upstream dependency graph 1214 includes upstream dependency 1216a between service feature 1208t and service feature 1208u of service 1206u. Upstream dependency 1216a indicates that service feature 1208t depends upon, or is impacted by, service feature 1208u. As another example, upstream dependency 1216b and upstream dependency 1216c indicate, respectively, that service feature 1208t depends upon, or is impacted by, service feature 1208v and service feature 1208w of service 1206v.

The upstream dependencies 1216 may include one or more upstream service features 1208 that are dependent upon, or impacted by, another upstream service feature 1208. As one example, the upstream dependency graph 1214 includes upstream dependency 1216d between service feature 1208u of service 1206u and service feature 1208x of service 1206x as well as upstream dependency 1216e between service feature 1208u and service feature 1208y. Together, upstream dependency 1216a and upstream dependency 1216d indicate that service feature 1208t is dependent upon, or impacted by, service feature 1208x. Additionally, upstream dependency 1216a and upstream dependency 1216e indicate that service feature 1208t is dependent upon, or impacted by, service feature 1208y. Service feature 1208t may be indirectly dependent upon, or indirectly impacted by, service feature 1208x and/or service feature 1208y by virtue of the upstream dependencies. The upstream dependencies are indicated by upstream dependency 1216d and upstream dependency 1216e. As another example, upstream dependency 1216f between service feature 1208v of service 1206v and service feature 1208z of service 1206z indicate that service feature 1208t is dependent upon, or impacted by, service feature 1208z. Service feature 1208t may be indirectly dependent upon service feature 1208z by virtue of upstream dependency 1216f.

The data corpus 1200 may include dependency graphs for all or a subset of service features 1208 of a particular services 1206 deployed in a partition. Additionally, or alternatively, the dependency graphs stored in the data corpus 1200 represent all or a subset of downstream dependencies 1212 and/or upstream dependencies 1216 between various service features 1208. In one example, the data corpus 1200 includes a particular set of dependency graphs for service features 1208 that are determined to be of particular interest for monitoring resource constraints in the cloud environment. The data corpus 1200 may include dependency graphs that are defined by a user such as a cloud operator. The dependency graphs that are defined by a user may correspond to particular service features 1208 and/or services 1206 that are of interest to the user. Additionally, or alternatively, the data corpus 1200 may include dependency graphs that are automatically generated by a mapping utility. The dependency graphs that are automatically generated by a mapping utility may correspond to particular service features 1208 and/or services 1206 that the mapping utility determines may be of interest to a user such as a cloud operator.

In one or more embodiments, the data corpus 1200 is any type of storage unit and/or device (e.g., a file system, database, collection of tables, or any other storage mechanism) for storing data. Further, the data corpus 1200 may include multiple different storage units and/or devices. The multiple different storage units and/or devices may or may not be of the same type or located at the same physical site. Further, the data corpus 1200 may be implemented or executed on the same computing system as the resource constraint management utility 1112 (FIGS. 11A and 11B). Additionally, or alternatively, the data corpus 1200 may be implemented or executed on a computing system separate from the resource constraint management utility 1112 (FIGS. 11A and 11B). The data corpus 1200 may be communicatively coupled to the resource constraint management utility 1112 (FIGS. 11A and 11B) via a direct connection or via a network. Information describing the data corpus 1200 may be implemented across any of components of the system 1100 (FIGS. 11A and 11B). However, this information is described with reference to the data corpus 1200 for purposes of clarity and explanation.

4. Example Weighting Metrics

Figure 13A:
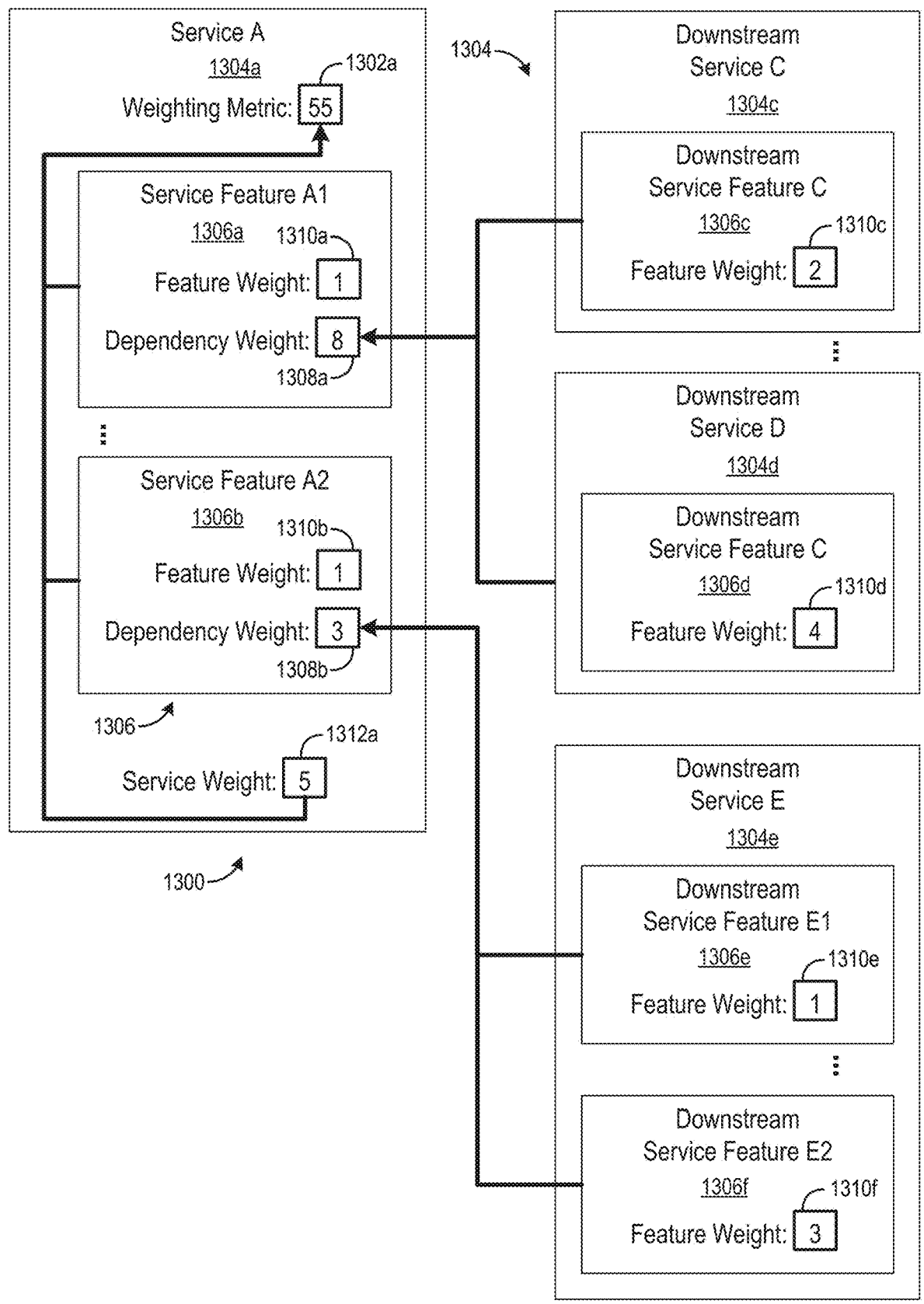
FIGS. 13A and 13B illustrate example weighting metrics for services of a system in accordance with one or more embodiments.
Figure 13B:
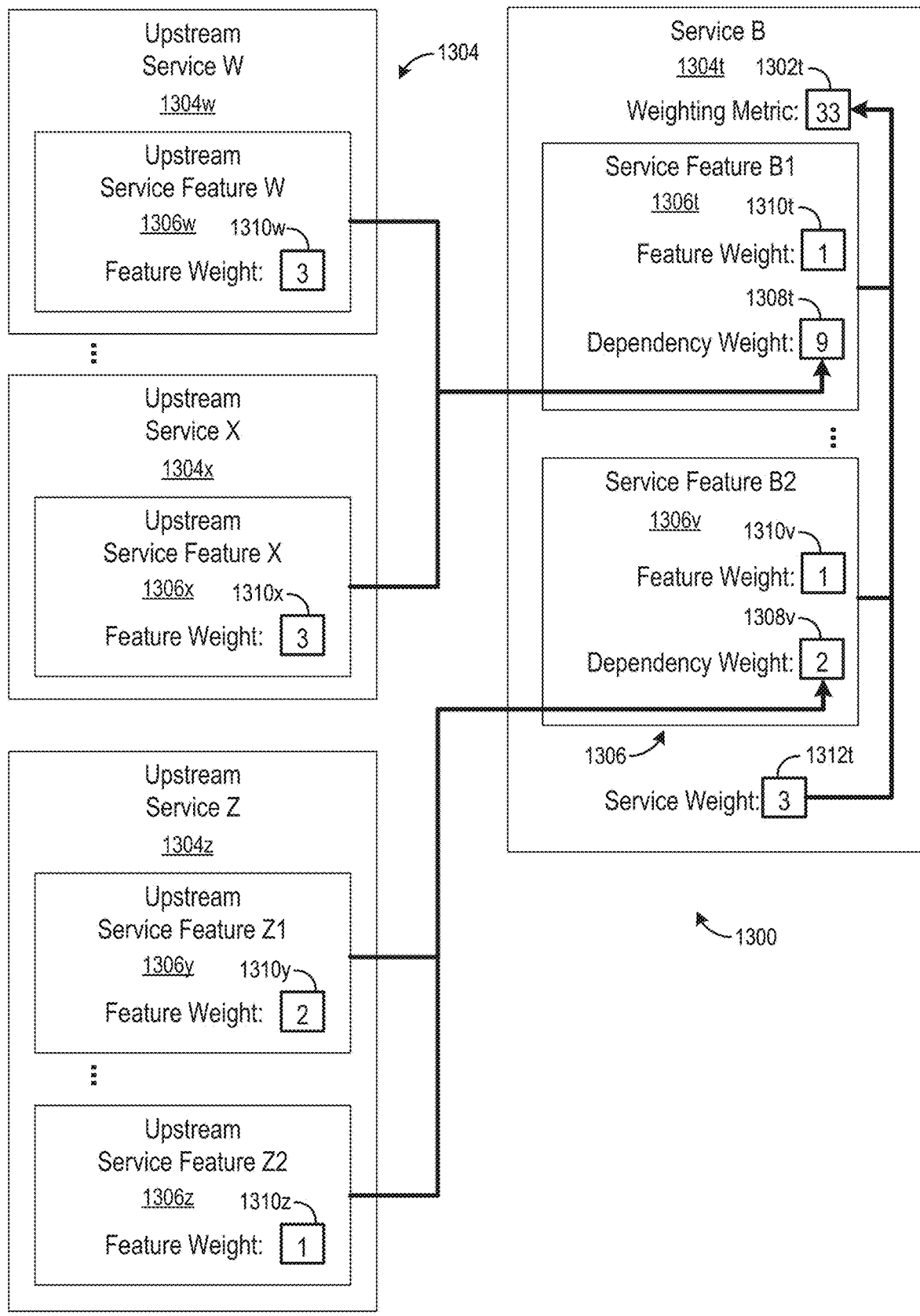

Referring to FIGS. 13A and 13B, example weighting metrics are further described. In one example, the weighting metrics represent an impact that a particular service feature has on one or more downstream service features and/or an impact that one or more upstream service features have on a particular service feature. A weighting metric may represent a sum, product, or composite of one or more input parameters utilized to compute the weighting metric. Additionally, or alternatively, the one or more input parameters may include functions, operators, variables, or constants. The one or more input parameters may be associated with a service and/or a service feature. The one or more input parameters may include weights applied to services and/or service features. The examples described below with reference to FIGS. 13A and 13B are provided for purposes of clarity and should not be construed as limiting the scope of any of the claims.

A. Metrics Based on Impacts on Downstream Service Features

Referring to FIG. 13A, metrics 1300 that represent impacts of service features on downstream service features are further described. The metrics 1300 include weighting metrics computed for services based on weights assigned to service features and/or services. The weighting metric for a service may represent a degree of importance, significance, value, or impact that one or more service features of the service have on one or more downstream services.

As shown in FIG. 13A, the system computes a weighting metric 1302a for service 1304a based on an impact that one or more service features 1306 of service 1304a have on one or more downstream service features 1306 of one or more downstream services 1304. Service 1304a includes service feature 1306a and service feature 1306b. In one example, a service feature may impact one or more downstream service features of one or more downstream services. Service feature 1306a impacts downstream service feature 1306c of service 1304c. Additionally, service feature 1306a impacts downstream service feature 1306d of service 1304d. In one example, a service feature may impact a plurality of downstream service features of a particular downstream service 1304. Service feature 1306b impacts downstream service feature 1306e and downstream service feature 1306f of service 1304c.

In one example, the system computes weighting metric 1302a for service 1304a based on a count of the downstream service features 1306 that are impacted by a service feature 1306 of service 1304a. Additionally, or alternatively, the system may compute weighting metric 1302a based on a dependency weight for a service feature 1306. The system may determine a dependency weight for a service feature based on one or more downstream service features that depend on the service feature. In one example, the weighting metric 1302a is based on dependency weight 1308a corresponding to service feature 1306a and/or dependency weight 1308b corresponding to service feature 1306b.

In one example, the system determines the dependency weight based on a count of the downstream service features. The system determines a count of the downstream service features and computes the dependency weight based on the count of the downstream service features. In one example, the dependency weight is the count of downstream service features. In one example, the dependency weight represents a product of the count of the downstream service and one or more functions, operators, variables, or constants. Additionally, or alternatively, the system determines the dependency weight based on feature weights for one or more downstream service features that depend on the service feature. Additionally, or alternatively, the dependency weight for a service feature may be computed based on a feature weight of the service feature. The feature weight of a service feature 1306 may represent an importance, significance, value, or impact of the service feature 1306.

As shown in FIG. 13A, the system computes dependency weight 1308a of service feature 1306a based on feature weight 1310c and feature weight 1310d. Feature weight 1310c corresponds to downstream service feature 1306c of service 1304c. Feature weight 1310d corresponds to downstream service feature 1306d of service 1304d. In one example, the dependency weight 1308a of service feature 1306a is additionally based on feature weight 1310a of service feature 1306a. In one example, dependency weight 1308a represents a sum, product, or composite of feature weight 1310a, feature weight 1310c, and feature weight 1310d. Additionally, or alternatively, dependency weight 1308a may represent a product of one or more functions, operators, variables, or constants associated with service feature 1306a, downstream service feature 1306c, and/or downstream service feature 1306d. As shown in FIG. 13A, dependency weight 1308a has a value of (8) representing a product of feature weight 1310c, feature weight 1310d, and feature weight 1310a (e.g., 2×4×1=8).

Additionally, or alternatively, as shown in FIG. 13A, the system computes dependency weight 1308b of service feature 1306b based on feature weight 1310e and feature weight 1310f. Feature weight 1310e corresponds to downstream service feature 1306c of service 1304e. Feature weight 1310f corresponds to downstream service feature 1306d of service 1304e. In one example, the dependency weight 1308b of service feature 1306b is additionally based on feature weight 1310b of service feature 1306b. In one example, dependency weight 1308b represents a sum, product, or composite of feature weight 1310b, feature weight 1310e, and feature weight 1310f. Additionally, or alternatively, dependency weight 1308b may represent a product of one or more functions, operators, variables, or constants associated with service feature 1306b, downstream service feature 1306e, and/or downstream service feature 1306f. As shown in FIG. 13A, dependency weight 1308b has a value of (3) representing a product of feature weight 1310e, feature weight 1310f, and feature weight 1310b (e.g., 1×3×1=3).

In one example, as shown in FIG. 13A, the system computes weighting metric 1302a based on dependency weight 1308a of service feature 1306a and dependency weight 1308b of service feature 1306b. In one example, the system may compute weighting metric 1302a based additionally on service weight 1312a of service 1304a. Service weight 1312a may represent an importance, significance, value, or impact of the service 1304a, for example, separate or in addition to, the importance, significance, value, or impact of the service feature 1306 of service 1304a. In one example, weighting metric 1302a represents a sum, product, or composite of dependency weight 1308a, dependency weight 1308b, and service weight 1312a. As shown in FIG. 13A, weighting metric 1302a has a value of (55) representing a product of service weight 1312a and dependency weight 1308a combined with a product of service weight 1312a and dependency weight 1308b (e.g., 8×5+3×5=55).

B. Metrics Based on Impacts from Upstream Service Features

Referring to FIG. 13B, metrics 1300 based on impacts on service features from upstream service features are further described. The metrics 1300 include weighting metrics computed for services based on weights assigned to service features and/or service features. The weighting metric for a service may represent a degree of importance, significance, value, or impact that one or more upstream services have on the service features of the service.

As shown in FIG. 13B, the system computes a weighting metric 1302t for service 1304t based on an impact that one or more upstream service features 1306 have on one or more service features 1306 of service 1304t. Service 1304t includes service feature 1306t and service feature 1306v. In one example, a service feature may be impacted by one or more upstream service features of one or more upstream services. Service feature 1306t is impacted by upstream service feature 1306w of service 1304w. Additionally, service feature 1306t is impacted by upstream service feature 1306x of service 1304x. In one example, a service feature may be impacted by a plurality of upstream service features of a particular upstream service. Service feature 1306v is impacted by upstream service feature 1306y and upstream service feature 1306z of service 1304z.

In one example, the system computes weighting metric 1302t for service 1304t based on a count of the downstream service features 1306 that are impacted by a service feature 1306 of service 1304t. Additionally, or alternatively, the system may compute weighting metric 1302t based on a dependency weight for a service feature 1306. The system may compute a dependency weight for a service feature based on one or more upstream service features that are depended upon by the service feature. In one example, the weighting metric 1302t is based on dependency weight 1308t corresponding to service feature 1306t and/or dependency weight 1308v corresponding to service feature 1306v.

In one example, the system determines the dependency weight based on a count of the upstream service features. The system determines a count of the upstream service features and computes the dependency weight based on the count of the upstream service features. In one example, the dependency weight is the count of upstream service features. In one example, the dependency weight represents a product of the count of the upstream service and one or more functions, operators, variables, or constants. Additionally, or alternatively, the system determines the dependency weight based on feature weights for one or more upstream service features that are depended upon by the service feature. Additionally, the dependency weight for a service feature may be computed based on a feature weight of the service feature. The feature weight of a service feature 1306 may represent an importance, significance, value, or impact of the service feature 1306.

In one example, as shown in FIG. 13B, the system computes dependency weight 1308t of service feature 1306t based on feature weight 1310w and feature weight 1310x. Feature weight 1310w corresponds to upstream service feature 1306w of service 1304w. Feature weight 1310x corresponds to upstream service feature 1306x of service 1304x. In one example, the dependency weight 1308t of service feature 1306t is additionally based on feature weight 1310t of service feature 1306t. In one example, dependency weight 1308t represents a sum, product, or composite of feature weight 1310t, feature weight 1310w, and feature weight 1310x. Additionally, or alternatively, dependency weight 1308t may represent a product of one or more functions, operators, variables, or constants associated with service feature 1306t, upstream service feature 1306w, and/or upstream service feature 1306x. As shown in FIG. 13A, dependency weight 1308t has a value of (9) representing a product of feature weight 1310w, feature weight 1310x, and feature weight 1310t (e.g., 3×3×1=9).

Additionally, or alternatively, as shown in FIG. 13B, the system computes dependency weight 1308v of service feature 1306v based on feature weight 1310y and feature weight 1310z. Feature weight 1310y corresponds to upstream service feature 1306y of service 1304z. Feature weight 1310z corresponds to upstream service feature 1306z of service 1304z. In one example, the dependency weight 1308v of service feature 1306v is additionally based on feature weight 1310v of service feature 1306v. In one example, dependency weight 1308v represents a sum, product, or composite of feature weight 1310v, feature weight 1310y, and feature weight 1310z. Additionally, or alternatively, dependency weight 1308v may represent a product of one or more functions, operators, variables, or constants associated with service feature 1306v, upstream service feature 1306y, and/or upstream service feature 1306z. As shown in FIG. 13B, dependency weight 1308v has a value of (2) representing a product of feature weight 1310y, feature weight 1310z, and feature weight 1310v (e.g., 2×1×1=2).

In one example, as shown in FIG. 13B, the system computes weighting metric 1302t based on dependency weight 1308t of service feature 1306t and dependency weight 1308v of service feature 1306v. In one example, the system may compute weighting metric 1302t based additionally on service weight 1312t of service 1304t. Service weight 1312t may represent an importance, significance, value, or impact of the service 1304t, for example, separate or in addition to, the importance, significance, value, or impact of the service feature 1306 of service 1304t. In one example, weighting metric 1302t represents a sum, product, or composite of dependency weight 1308t, dependency weight 1308v, and service weight 1312t. As shown in FIG. 13B, weighting metric 1302t has a value of (33) representing a product of service weight 1312t and dependency weight 1308t combined with a product of service weight 1312t and dependency weight 1308v (e.g., 3×9+3×2=33).

5. Example Operations for Managing Resource Constraints

Figure 14:
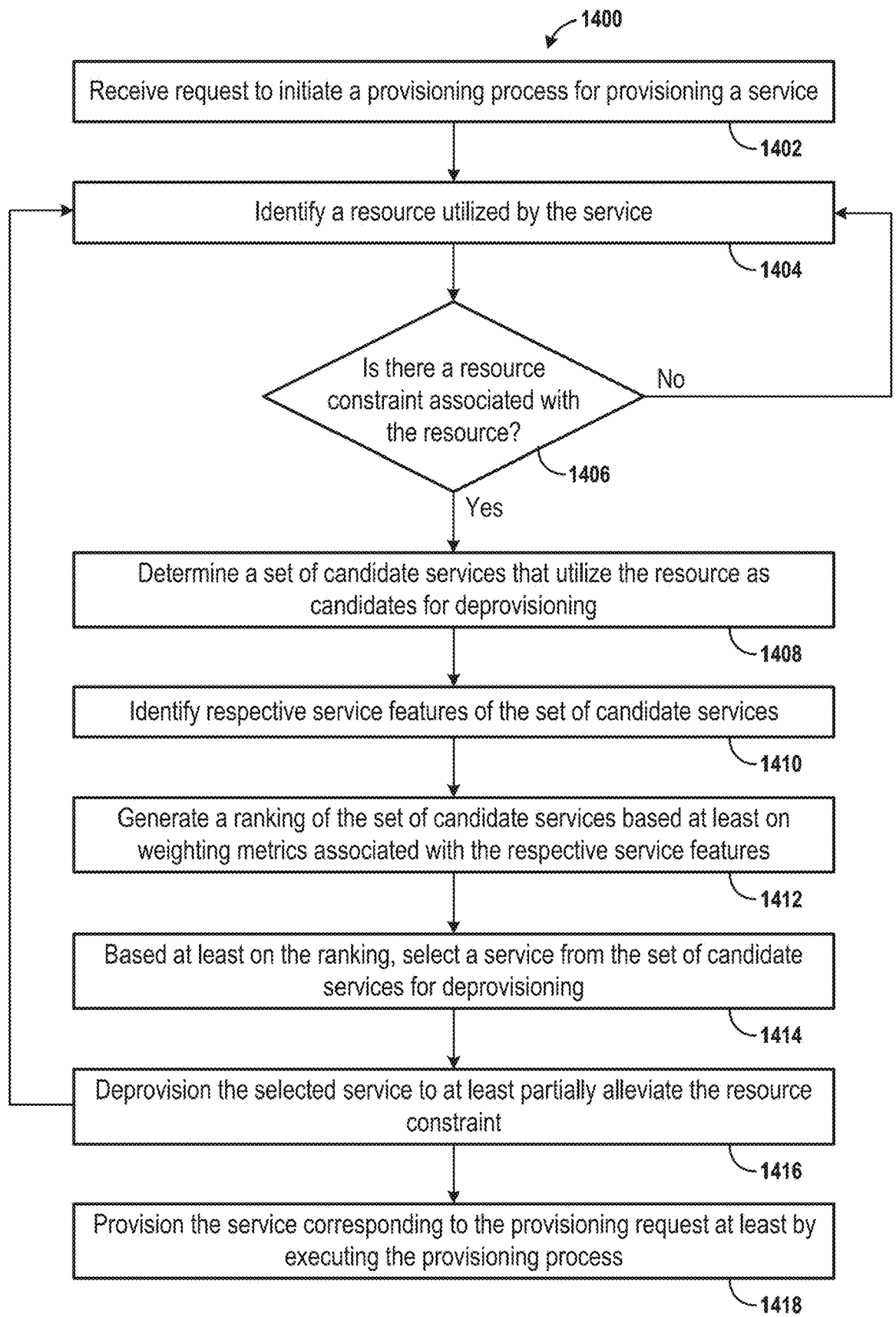
FIG. 14 illustrates an example set of operations for managing resource constraints of a system in accordance with one or more embodiments.

Referring to FIG. 14, example operations 1400 pertaining to managing resource constraints associated with resources of a cloud environment are further described in accordance with one or more embodiments. In one example, a system may execute operations 1400 pertaining to determining a resource constraint associated with a resource and deprovisioning one or more services that utilize the resource to alleviate the resource constraint. One or more operations 1400 described with reference to FIG. 14 may be modified, combined, rearranged, or omitted. Accordingly, the particular sequence of operations 1400 described with reference to FIG. 14 should not be construed as limiting the scope of one or more embodiments. In one example, the operations 1400 may be performed by the one or more components of the system described with reference to FIGS. 11A and 11B.

As shown in FIG. 14, a system receives a request to initiate a provisioning process for provisioning a service (Operation 1402). The request may be generated by a user and received from a user interface device. Additionally, or alternatively, the request may be generated by a configuration management utility that manages provisioning of services in the cloud environment. Prior to initiating the provisioning process for provisioning the service, the system may determine whether a resource constraint exits with respect to one or more resources that will be utilized by the service to be provisioned. The resource constraint may be determined with respect to the provisioning process and/or with respect to operations of the service after having been provisioned.

To determine whether a resource constraint exits with respect to one or more resources that will be utilized by the service to be provisioned, the system identifies a resource utilized by the service (Operation 1404) and checks whether there is a resource constraint associated with the resource (Operation 1406). If the resource does not have a resource constraint, the system returns to operation 1404. If the system determines that a resource constraint exists with respect to a resource, the system determines a set of candidate services that utilize the resource as candidates for deprovisioning (Operation 1408). The set of candidate services may be determined based on a mapping of the resource to one or more services that utilize the resource. The mapping may be stored in a data repository and/or in metadata associated with the resource.

In one example, the system selects a service for deprovisioning from the set of candidate services. As shown in FIG. 14, in one example, the system identifies respective service features of the set of candidate services (Operation 1410) and generates a ranking of the set of candidate services based on weighting metrics associated with the respective service features (Operation 1412). Based at least on the ranking, the system selects a service from the set of candidate services for deprovisioning (Operation 1414). The system may identify the service features of the set of candidate services based on mappings of the candidate services to service features of the respective candidate services. The mapping may be stored in a data repository and/or in metadata associated with the respective services. The system may generate the rankings based on weights assigned to the respective service features.

Upon having selected a service for deprovisioning, the system deprovisions the selected service to at least partially alleviate the resource constraint (Operation 1416). The system may deprovision the selected service by executing a deprovisioning process corresponding to the selected service. The deprovisioning process may include one or more of the following deprovisioning operations: backing up and/or exporting data associated with the service, notifying stakeholders that the service is being deprovisioned, obtaining approval from stakeholders to deprovision the service, scheduling a time for deprovisioning the service, disabling and/or redirecting network traffic associated with the service, scaling down utilization of the service, terminating execution of the service, or releasing resources associated with the service.

Upon having deprovisioned the selected service, the system provisions the service corresponding to the provisioning request at least by executing the provisioning process (Operation 1418). The provisioning process may include one or more of the following provisioning operations: allocating resources to the service, executing a build process for the service, executing configuration management operations, implementing security protocols, testing the service, starting operations of the service, notifying stakeholders that the service is provisioned, or scaling up utilization of the service.

In one example, the ranking utilized to select the service for deprovisioning is further based on feature weights associated with one or more downstream service features that depend upon one or more service features of the respective candidate services. The system may determine the feature weights based on a dependency graph that graphs dependencies between services and service features. In one example, the ranking is further based on feature metrics that represent operational impacts associated with respective service features of the set of candidate services. In one example, the data corpus includes a foreign key representing the service feature that corresponds to a primary key representing the dependency graph for the service feature. The system may determine the foreign key from the mapping between the service feature and the service. The system may determine the one or more downstream service features by traversing the dependency graph and retrieving values corresponding to the downstream service features.

In one example, the system determines a ranking adjustment corresponding to one or more services of the set of candidate services based on one or more previous occurrences of a particular service having been deprovisioned in connection with one or more previous resource constraints. The system may adjust the ranking to avoid having the particular service being repeatedly deprovisioned. As a result of adjusting the ranking, one or more services are ranked higher in the ranking than if the ranking had not been adjusted and/or one or more services are ranked lower in the ranking than if the ranking had not been adjusted.

6. Example Constraint Management Interface

Figure 15:
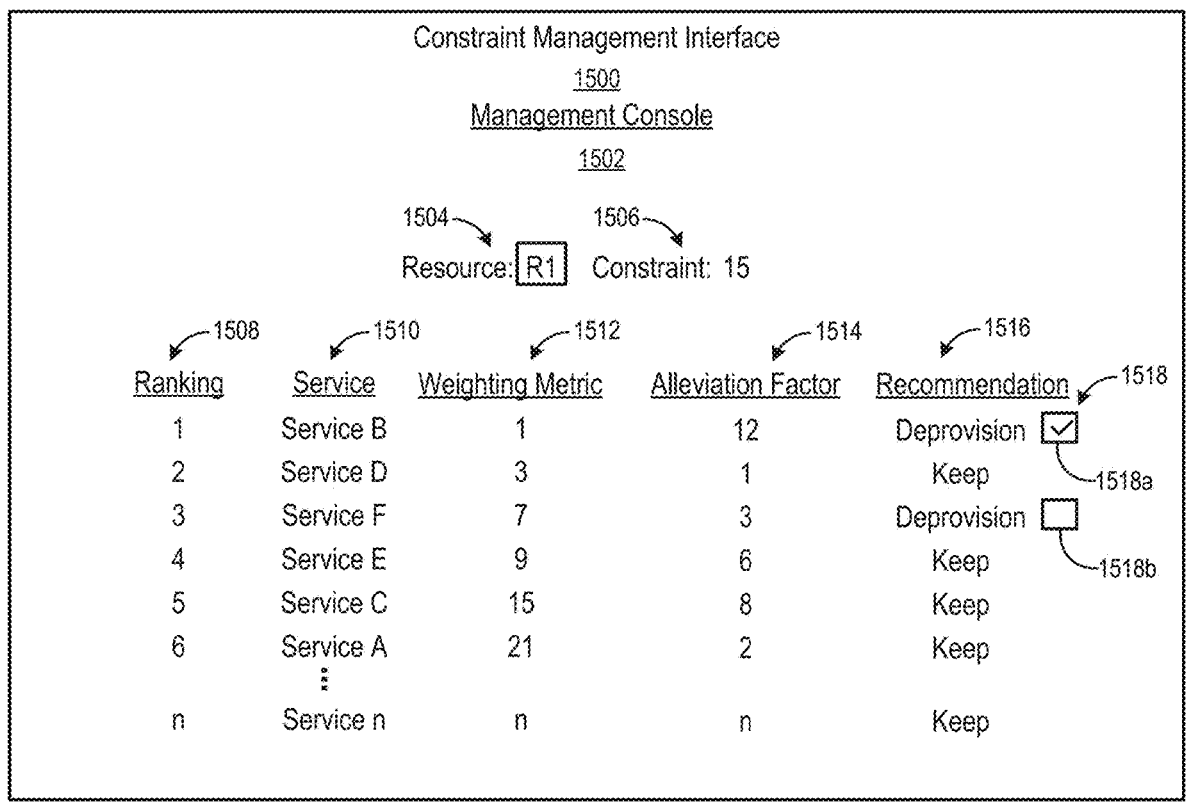
FIG. 15 illustrates an example constraint management interface for managing resource constraints of a system in accordance with one or more embodiments.

FIG. 15 illustrates an example constraint management interfaces in accordance with one or more embodiments. The example constraint management interface may be utilized for managing resource constraints associated with resources of a system and deprovisioning services that utilize the resources to alleviate the resource constraints. The resource constraint management interface may be utilized to monitor operations of the system and/or initiate and/or approve operations of the system such as deprovisioning of services. The examples provided with reference to FIG. 15 are for purposes of clarity. Components and/or operations described with reference to FIG. 15 should be understood as examples that may not be applicable to certain embodiments. Accordingly, components and/or operations described with reference to FIG. 15 should not be construed as limiting the scope of any of the claims.

As shown in FIG. 15, in one example, a constraint management interface 1500 indicates a management console 1502 that displays information pertaining to resource constraints associated with one or more resources. As shown in FIG. 15, the management console 1502 indicates that resource 1504 has a resource constraint 1506. Additionally, the management console 1502 includes a ranking 1508 for a set of services 1510 that utilize the resource 1504. In one example, the management console 1502 includes weighting metrics 1512 corresponding to the services 1510. The weighting metrics 1512 may respectively represent a degree of importance, significance, value, or impact of the corresponding services 1510 and/or of the services features respectively associated with the services 1510. Additionally, or alternatively, the management console 1502 may include alleviation factors 1514 corresponding to the services 1510. The alleviation factors 1514 may represent an extent that the resource constraint may be alleviated by deprovisioning a respective service 1510. The alleviation factors may be compared to the resource constraint 1506 to determine services 1510 for deprovisioning to alleviate the resource constraint 1506.

In one example, the management console 1502 may include a recommendation 1516 corresponding to the respective services 1510. The recommendation 1516 may indicate whether the system recommends deprovisioning a particular service 1510 and/or whether the system recommends keeping a particular service 1510. In one example, the management console 1502 may include one or more selection buttons 1518. A user may interact with the selection buttons 1518 to provide an input that instructs the system whether or not to proceed with a recommendation 1516.

As shown in FIG. 15, the services 1510 are ranked according to the weighting metric 1512 and displayed in the management console 1502 according to the ranking 1508. Service B has a weighting metric 1512 value of (1) and is ranked first in the ranking, indicating that Service B has a relatively lower value than the other services included in the ranking 1508. Additionally, the management console 1502 indicates that the resource 1504 has a resource constraint value of (15). Service B has an alleviation factor of (12). A comparison of the alleviation factor of (12) for Service B to the resource constraint value of (15) indicates that deprovisioning service B may alleviate most, but not all, of the resource constraint 1506. As shown in FIG. 15, the system recommends deprovisioning Service B. The recommendation 1516 may be based on the relatively lower weighting metric 1512 and/or the relatively higher alleviation factor 1514 for Service B compared to the other services 1510 included in the ranking 1508. As shown in FIG. 15, a user has selected selection button 1518a to provide an indication to the system to proceed with deprovisioning Service B. Additionally, the recommendation 1516 for Service F indicates that the system recommends deprovisioning Service F. The weighting metric 1512 for Service F has a value of (7), and Service F is ranked third in the ranking 1508, below Service D. Service F has an alleviation factor 1514 of (1) and Service D has an alleviation factor of (3). Although Service D has a higher ranking than Service F based on the respective weighting metrics 1512, the alleviation factor for Service D, together with the alleviation factor for Service B, is insufficient to fully alleviate the resource constraint 1506 (e.g., 12+1<15). The alleviation factor for Service F, together with the alleviation factor for Service B alleviates the resource constraint (e.g., 12+3=15). The recommendation 1516 by the system to deprovision Service F may be based on a combination of the weighting metrics 1512 and the alleviation factors 1514. In one example, the system may recommend deprovisioning Service F, together with Service B, to alleviate the resource constraint 1506 by deprovisioning a relatively fewer number of services 1510. A user may provide an indication to the system to proceed with deprovisioning Service F by selecting selection button 1518b.

7. Miscellaneous; Extensions

Unless otherwise defined, all terms (including technical and scientific terms) are to be given their ordinary and customary meaning to a person of ordinary skill in the art, and are not to be limited to a special or customized meaning unless expressly so defined herein.

This application may include references to certain trademarks. Although the use of trademarks is permissible in patent applications, the proprietary nature of the marks should be respected and every effort made to prevent their use in any manner which might adversely affect their validity as trademarks.

Embodiments are directed to a system with one or more devices that include a hardware processor and that are configured to perform any of the operations described herein and/or recited in any of the claims below.

In an embodiment, one or more non-transitory computer-readable storage media comprises instructions which, when executed by one or more hardware processors, cause performance of any of the operations described herein and/or recited in any of the claims.

In an embodiment, a method comprises operations described herein and/or recited in any of the claims, the method being executed by at least one device including a hardware processor.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A method comprising:
    receiving a request to initiate a first provisioning process for provisioning a first service in a cloud environment, wherein the first service utilizes a first resource in the cloud environment;
    determining a first resource constraint associated with the first resource;
    determining, based on the first resource constraint, a set of candidate services that utilize the first resource, as candidates for deprovisioning from the cloud environment;
    identifying respective service features of the set of candidate services;
    generating a ranking of the set of candidate services, based at least on weighting metrics associated with the respective service features of the set of candidate services;
    based at least on the ranking, selecting a second service of the set of candidate services for deprovisioning from the cloud environment;
    deprovisioning the second service, to at least partially alleviate the first resource constraint;
    after deprovisioning the second service from the cloud environment, provisioning the first service in the cloud environment at least by executing the first provisioning process;
    wherein the method is performed by at least one device including a hardware processor.

2. The method of claim 1, wherein the ranking is further based on weighting metrics associated with the set of candidate services.

3. The method of claim 1, further comprising:
prior to initiating the first provisioning process: receiving user input that assigns one or more of the weighting metrics associated with respective service features of the set of candidate services.

4. The method of claim 1, wherein the ranking is further based on feature weights associated with one or more downstream service features that depend upon one or more service features of the set of candidate services.

5. The method of claim 4, wherein generating the ranking comprises:
determining the feature weights associated with respective service features of the set of candidate services, based on a dependency graph that graphs dependencies between services and service features in the cloud environment.

6. The method of claim 1, wherein the ranking is further based on operational impact metrics associated with respective service features of the set of candidate services.

7. The method of claim 1, further comprising:
determining a ranking adjustment corresponding to a third service, of the set of candidate services, based on one or more previous occurrences of the third service having been deprovisioned in connection with one or more previous resource constraints;
adjusting the ranking based on the ranking adjustment, wherein adjusting the ranking results in one or more of (a) the second service being ranked higher in the ranking than if the ranking had not been adjusted or (b) the third service being ranked lower in the ranking than if the ranking had not been adjusted.

8. The method of claim 1, further comprising:
determining a ranking adjustment corresponding to the second service based on one or more previous occurrences of the second service being selected for deprovisioning from the cloud environment;
adjusting the ranking based on the ranking adjustment, wherein adjusting the ranking results in one or more of (a) the second service being ranked higher in the ranking than if the ranking had not been adjusted or (b) a fourth service, of the set of candidate services, being ranked lower in the ranking than if the ranking had not been adjusted.

9. The method of claim 1, wherein:
the cloud environment is provided by a first entity;
the weighting metrics associated with the respective service features of the set of candidate services are provided by a second entity; and
the first entity controls, at least in part, access to the cloud environment by the second entity.

10. The method of claim 1, wherein:
the cloud environment comprises one or more partitions associated with a third entity; and
the second entity controls, at least in part, access to the one or more partitions by the third entity.

11. One or more non-transitory computer-readable media storing instructions that, when executed by one or more hardware processors, cause performance of operations comprising:
receiving a request to initiate a first provisioning process for provisioning a first service in a cloud environment, wherein the first service utilizes a first resource in the cloud environment;
determining a first resource constraint associated with the first resource;
determining, based on the first resource constraint, a set of candidate services that utilize the first resource, as candidates for deprovisioning from the cloud environment;
identifying respective service features of the set of candidate services;
generating a ranking of the set of candidate services, based at least on weighting metrics associated with the respective service features of the set of candidate services;
based at least on the ranking, selecting a second service of the set of candidate services for deprovisioning from the cloud environment;
deprovisioning the second service, to at least partially alleviate the first resource constraint;
after deprovisioning the second service from the cloud environment, provisioning the first service in the cloud environment at least by executing the first provisioning process.

12. The one or more non-transitory computer-readable media of claim 11, wherein the ranking is further based on weighting metrics associated with the set of candidate services.

13. The one or more non-transitory computer-readable media of claim 11, wherein the operations further comprise:
prior to initiating the first provisioning process: receiving user input that assigns one or more of the weighting metrics associated with respective service features of the set of candidate services.

14. The one or more non-transitory computer-readable media of claim 11, wherein the ranking is further based on feature weights associated with one or more downstream service features that depend upon one or more service features of the set of candidate services.

15. The one or more non-transitory computer-readable media of claim 14, wherein generating the ranking comprises:
determining the feature weights associated with respective service features of the set of candidate services, based on a dependency graph that graphs dependencies between services and service features in the cloud environment.

16. The one or more non-transitory computer-readable media of claim 11, wherein the ranking is further based on operational impact metrics associated with respective service features of the set of candidate services.

17. The one or more non-transitory computer-readable media of claim 11, wherein the operations further comprise:
determining a ranking adjustment corresponding to a third service, of the set of candidate services, based on one or more previous occurrences of the third service having been deprovisioned in connection with one or more previous resource constraints;
adjusting the ranking based on the ranking adjustment, wherein adjusting the ranking results in one or more of (a) the second service being ranked higher in the ranking than if the ranking had not been adjusted or (b) the third service being ranked lower in the ranking than if the ranking had not been adjusted.

18. The one or more non-transitory computer-readable media of claim 11, wherein the operations further comprise:
determining a ranking adjustment corresponding to the second service based on one or more previous occurrences of the second service being selected for deprovisioning from the cloud environment;
adjusting the ranking based on the ranking adjustment, wherein adjusting the ranking results in one or more of (a) the second service being ranked higher in the ranking than if the ranking had not been adjusted or (b) a fourth service, of the set of candidate services, being ranked lower in the ranking than if the ranking had not been adjusted.

19. The one or more non-transitory computer-readable media of claim 11, wherein:

the cloud environment is provided by a first entity;

the weighting metrics associated with the respective service features of the set of candidate services are provided by a second entity; and the first entity controls, at least in part, access to the cloud environment by the second entity.

20. A system comprising:

at least one device including a hardware processor;

the system being configured to perform operations comprising:

receiving a request to initiate a first provisioning process for provisioning a first service in a cloud environment, wherein the first service utilizes a first resource in the cloud environment;

determining a first resource constraint associated with the first resource;

determining, based on the first resource constraint, a set of candidate services that utilize the first resource, as candidates for deprovisioning from the cloud environment;

identifying respective service features of the set of candidate services;

generating a ranking of the set of candidate services, based at least on weighting metrics associated with the respective service features of the set of candidate services;

based at least on the ranking, selecting a second service of the set of candidate services for deprovisioning from the cloud environment;

deprovisioning the second service, to at least partially alleviate the first resource constraint;

after deprovisioning the second service from the cloud environment, provisioning the first service in the cloud environment at least by executing the first provisioning process.

* * * * *